US009559932B2

(12) United States Patent
Soumiya et al.

(10) Patent No.: US 9,559,932 B2
(45) Date of Patent: Jan. 31, 2017

(54) ROUTE DETERMINATION APPARATUS AND TRANSFER ROUTE DETERMINATION METHOD

(71) Applicant: FUJITSU LIMITED, Kawasaki-shi, Kanagawa (JP)

(72) Inventors: Toshio Soumiya, Yokohama (JP); Akiko Yamada, Kawasaki (JP); Sho Shimizu, San Jose, CA (US)

(73) Assignee: FUJITSU LIMITED, Kawasaki (JP)

( * ) Notice: Subject to any disclaimer, the term of this patent is extended or adjusted under 35 U.S.C. 154(b) by 81 days.

(21) Appl. No.: 14/665,324

(22) Filed: Mar. 23, 2015

(65) Prior Publication Data

US 2015/0350085 A1 Dec. 3, 2015

(30) Foreign Application Priority Data

May 30, 2014 (JP) ................................ 2014-112361

(51) Int. Cl.
*H04L 12/26* (2006.01)
*H04L 12/801* (2013.01)
(Continued)

(52) U.S. Cl.
CPC ....... *H04L 43/0894* (2013.01); *H04L 41/0668* (2013.01); *H04L 43/0852* (2013.01);
(Continued)

(58) Field of Classification Search
CPC .......... H04L 47/11; H04L 47/12; H04L 47/28; H04L 47/283; H04L 47/29; H04L 47/10; H04L 41/0668; H04L 45/127; H04L 45/125; H04L 45/02; H04L 43/0852; H04L 43/0894; H04L 43/16; H04L 43/10; H04L 43/106
See application file for complete search history.

(56) References Cited

U.S. PATENT DOCUMENTS

| 7,649,845 | B2 * | 1/2010 | Mukherjee | .......... H04L 43/0852 370/235 |
| 2002/0167942 | A1 * | 11/2002 | Fulton | ................. G06F 11/3419 370/352 |
| 2012/0250514 | A1 * | 10/2012 | Hiramoto | .............. H04L 45/121 370/237 |

OTHER PUBLICATIONS

Sho Shimizu et al., "Study on Scalable Messaging System for Distributed SDN Controller", IEICE Technical Report, The Institute of Electronics, Information and Communication Engineers, vol. 113, No. 472, NS2013-212, pp. 207-212, Mar. 2014 (17 pages).

(Continued)

*Primary Examiner* — Kwang B Yao
*Assistant Examiner* — Ricardo Castaneyra
(74) *Attorney, Agent, or Firm* — Fujitsu Patent Center

(57) ABSTRACT

The processor obtains a process time, which is a time taken for processing a control message when the control device requests that a target processing device, selected from among the plurality of processing devices, process a control message. When the process time has become longer than a first threshold, the processor determines which of a first and a second congestion has occurred based on whether the process time has become longer than a second threshold, which is greater than the first threshold. The first congestion occurs in the transfer devices used for a communication between the control device and the target processing device. The second congestion occurs in the target processing device. The network connection device transmits a request message requesting that a transfer route for which it has been determined that the control message is not processed in a device in which the congestion has occurred be set.

7 Claims, 22 Drawing Sheets

(51) Int. Cl.
*H04L 12/729* (2013.01)
*H04L 12/721* (2013.01)
*H04L 12/24* (2006.01)

(52) U.S. Cl.
CPC .......... *H04L 45/125* (2013.01); *H04L 45/127* (2013.01); *H04L 47/10* (2013.01); *H04L 47/11* (2013.01); *H04L 47/29* (2013.01)

(56) References Cited

OTHER PUBLICATIONS

Sho Shimizu et al., "Study of Distributed Network Controller and Development of Benchmark Tool for the Controller in SDN", The Institute of Electronics, Information and Communication Engineers, General Conference, Institute of Electronics, Information and Communication Engineers, BS-2-4, pp. S130-S131, Mar. 2013 (7 pages).

\* cited by examiner

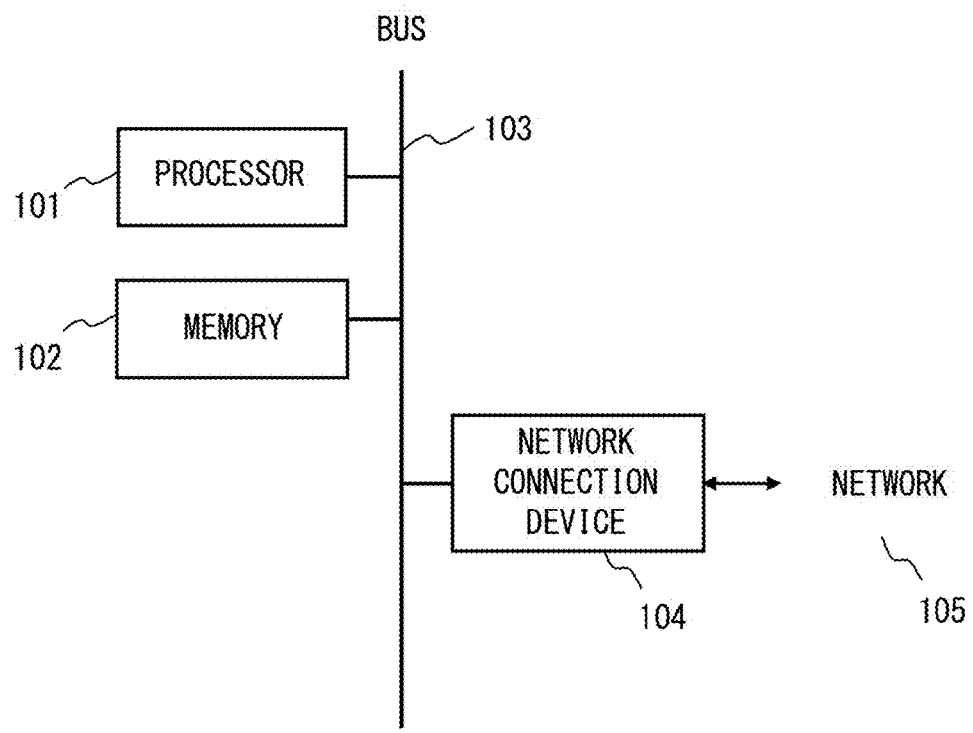
F I G. 6

| FLOW | NODE | APPLICATION TYPE | CONTROL DEVICE | TRANSFER DEVICE (UPLINK) | MESSAGE QUEUE (UPLINK) | PROCESSING DEVICE | TRANSFER DEVICE (DOWNLINK) | MESSAGE QUEUE (DOWNLINK) |
|---|---|---|---|---|---|---|---|---|
| A | NODE 6a | AP1 | CONTROL DEVICE 30a | TRANSFER DEVICE 10a | Q11 | PROCESSING DEVICE 20d | TRANSFER DEVICE 10b | Q21 |
| B | NODE 6a | AP2 | CONTROL DEVICE 30a | TRANSFER DEVICE 10a | Q12 | PROCESSING DEVICE 20e | TRANSFER DEVICE 10b | Q21 |
| C | NODE 6b | AP2 | CONTROL DEVICE 30a | TRANSFER DEVICE 10a | Q12 | PROCESSING DEVICE 20e | TRANSFER DEVICE 10b | Q22 |
| D | NODE 6a | AP1 | CONTROL DEVICE 30a | TRANSFER DEVICE 10a | Q11 | PROCESSING DEVICE 20d | TRANSFER DEVICE 10b | Q22 |

71-1

F I G. 8

| FLOW | APPLICATION TYPE | TRANSFER DEVICE (UPLINK) | MESSAGE QUEUE (UPLINK) |
|---|---|---|---|
| A | AP1 | TRANSFER DEVICE 10a | Q11 |
| B | AP2 | TRANSFER DEVICE 10a | Q12 |
| C | AP2 | TRANSFER DEVICE 10a | Q12 |
| D | AP1 | TRANSFER DEVICE 10a | Q11 |
| ... | ... | ... | ... |

41-1

| MESSAGE QUEUE (UPLINK) | TRANSFER-SOURCE CONTROL DEVICE | APPLICATION TYPE | TRANSFER-DESTINATION PROCESSING DEVICE |
|---|---|---|---|
| Q11 | CONTROL DEVICE 30a | AP1 | PROCESSING DEVICE 20d |
| Q12 | CONTROL DEVICE 30a | AP2 | PROCESSING DEVICE 20e |

T1

| MESSAGE QUEUE (DOWNLINK) | TRANSFER-SOURCE PROCESSING DEVICE | | TRANSFER-DESTINATION CONTROL DEVICE |
|---|---|---|---|
| Q21 | PROCESSING DEVICE 20d | PROCESSING DEVICE 20e | CONTROL DEVICE 30a |
| Q22 | PROCESSING DEVICE 20d | PROCESSING DEVICE 20e | CONTROL DEVICE 30a |

T2

| FLOW | CONTROL DEVICE | TRANSFER DEVICE (DOWNLINK) | MESSAGE QUEUE (DOWNLINK) |
|---|---|---|---|
| A | CONTROL DEVICE 30a | TRANSFER DEVICE 10b | Q21 |
| D | CONTROL DEVICE 30a | TRANSFER DEVICE 10b | Q22 |
| ... | ... | ... | ... |

T3

| FLOW | CONTROL DEVICE | TRANSFER DEVICE (DOWNLINK) | MESSAGE QUEUE (DOWNLINK) |
|---|---|---|---|
| B | CONTROL DEVICE 30a | TRANSFER DEVICE 10b | Q21 |
| C | CONTROL DEVICE 30a | TRANSFER DEVICE 10b | Q22 |
| ... | ... | ... | ... |

T4

F I G. 9

| FLOW | MESSAGE QUEUE CONGESTION DETERMINATION THRESHOLD | MESSAGE QUEUE CONGESTION CANCELLATION THRESHOLD | APPLICATION CONGESTION DETERMINATION THRESHOLD | APPLICATION CONGESTION CANCELLATION THRESHOLD |
|---|---|---|---|---|
| A | 100ns | 50ns | 200ms | 100ms |
| B | 150ns | 75ns | 300ms | 150ms |
| C | 150ns | 75ns | 300ms | 150ms |
| D | 100ns | 50ns | 200ms | 100ms |

FIG. 11

| FLOW | PROCESS TIME | DETERMINATION RESULT |
|---|---|---|
| A | 220ms | 2 |
| B | 20ns | 0 |
| C | 20ns | 0 |
| D | 230ms | 2 |

F I G. 1 2

| FLOW | NODE | APPLICATION TYPE | CONTROL DEVICE | TRANSFER DEVICE (UPLINK) | MESSAGE QUEUE (UPLINK) | PROCESSING DEVICE | TRANSFER DEVICE (DOWNLINK) | MESSAGE QUEUE (DOWNLINK) |
|---|---|---|---|---|---|---|---|---|
| A | NODE 6a | AP1 | CONTROL DEVICE 30a | TRANSFER DEVICE 10a | Q11 | PROCESSING DEVICE 20c | TRANSFER DEVICE 10b | Q21 |
| B | NODE 6a | AP2 | CONTROL DEVICE 30a | TRANSFER DEVICE 10a | Q12 | PROCESSING DEVICE 20e | TRANSFER DEVICE 10b | Q21 |
| C | NODE 6b | AP2 | CONTROL DEVICE 30a | TRANSFER DEVICE 10a | Q12 | PROCESSING DEVICE 20e | TRANSFER DEVICE 10b | Q22 |
| D | NODE 6b | AP1 | CONTROL DEVICE 30a | TRANSFER DEVICE 10a | Q11 | PROCESSING DEVICE 20c | TRANSFER DEVICE 10b | Q22 |

71-2

T5

| MESSAGE QUEUE (UPLINK) | TRANSFER-SOURCE CONTROL DEVICE | APPLICATION TYPE | TRANSFER-DESTINATION PROCESSING DEVICE |
|---|---|---|---|
| Q11 | CONTROL DEVICE 30a | AP1 | PROCESSING DEVICE 20c |
| Q12 | CONTROL DEVICE 30a | AP2 | PROCESSING DEVICE 20e |

T6

| MESSAGE QUEUE (UPLINK) | TRANSFER-SOURCE PROCESSING DEVICE | TRANSFER-DESTINATION PROCESSING DEVICE |
|---|---|---|
| Q21 | PROCESSING DEVICE 20d | CONTROL DEVICE 30a |
| Q22 | PROCESSING DEVICE 20d | CONTROL DEVICE 30a |

FIG. 13

| FLOW | PROCESS TIME | DETERMINATION RESULT |
|---|---|---|
| A | 110ns | 1 |
| B | 20ns | 0 |
| C | 20ns | 0 |
| D | 130ns | 1 |

Table 71-3:

| FLOW | NODE | APPLICATION TYPE | CONTROL DEVICE | TRANSFER DEVICE (UPLINK) | MESSAGE QUEUE (UPLINK) | PROCESSING DEVICE | TRANSFER DEVICE (DOWNLINK) | MESSAGE QUEUE (DOWNLINK) |
|---|---|---|---|---|---|---|---|---|
| A | NODE 6a | AP1 | CONTROL DEVICE 30a | TRANSFER DEVICE 10c | Q31 | PROCESSING DEVICE 20d | TRANSFER DEVICE 10b | Q21 |
| B | NODE 6a | AP2 | CONTROL DEVICE 30a | TRANSFER DEVICE 10a | Q12 | PROCESSING DEVICE 20e | TRANSFER DEVICE 10b | Q21 |
| C | NODE 6b | AP2 | CONTROL DEVICE 30a | TRANSFER DEVICE 10a | Q12 | PROCESSING DEVICE 20e | TRANSFER DEVICE 10b | Q22 |
| D | NODE 6b | AP1 | CONTROL DEVICE 30a | TRANSFER DEVICE 10c | Q31 | PROCESSING DEVICE 20d | TRANSFER DEVICE 10b | Q22 |

Table 41-2:

| FLOW | APPLICATION TYPE | TRANSFER DEVICE (UPLINK) | MESSAGE QUEUE (UPLINK) |
|---|---|---|---|
| A | AP1 | TRANSFER DEVICE 10c | Q31 |
| B | AP2 | TRANSFER DEVICE 10a | Q12 |
| C | AP2 | TRANSFER DEVICE 10a | Q12 |
| D | AP1 | TRANSFER DEVICE 10c | Q31 |

Table T7:

| TRANSFER-SOURCE CONTROL DEVICE | APPLICATION TYPE | TRANSFER-DESTINATION PROCESSING DEVICE |
|---|---|---|
| CONTROL DEVICE 30a | AP1 | PROCESSING DEVICE 20d |

| MESSAGE QUEUE (UPLINK) |
|---|
| Q11 |

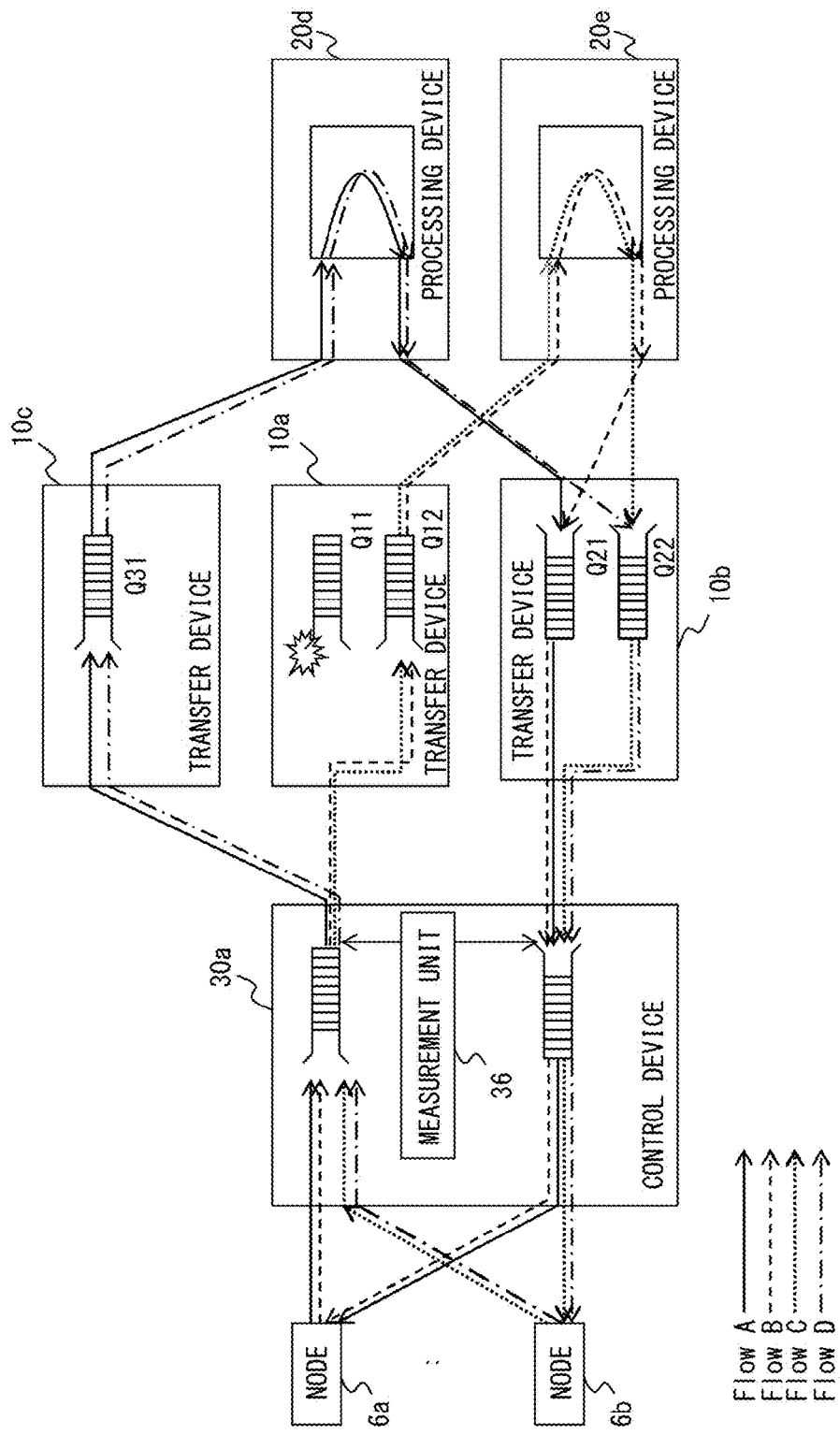
F I G. 17

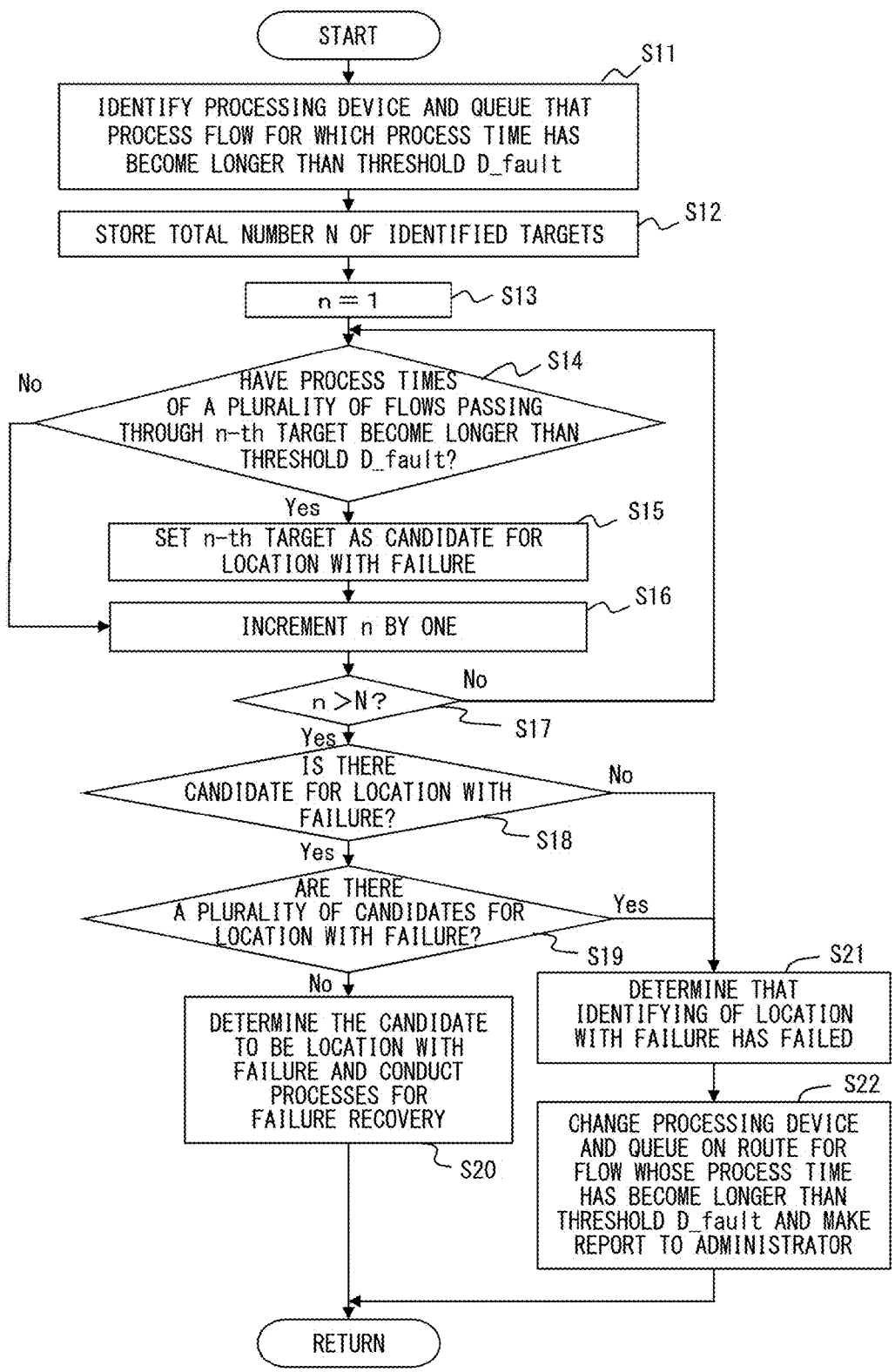
F I G. 1 9

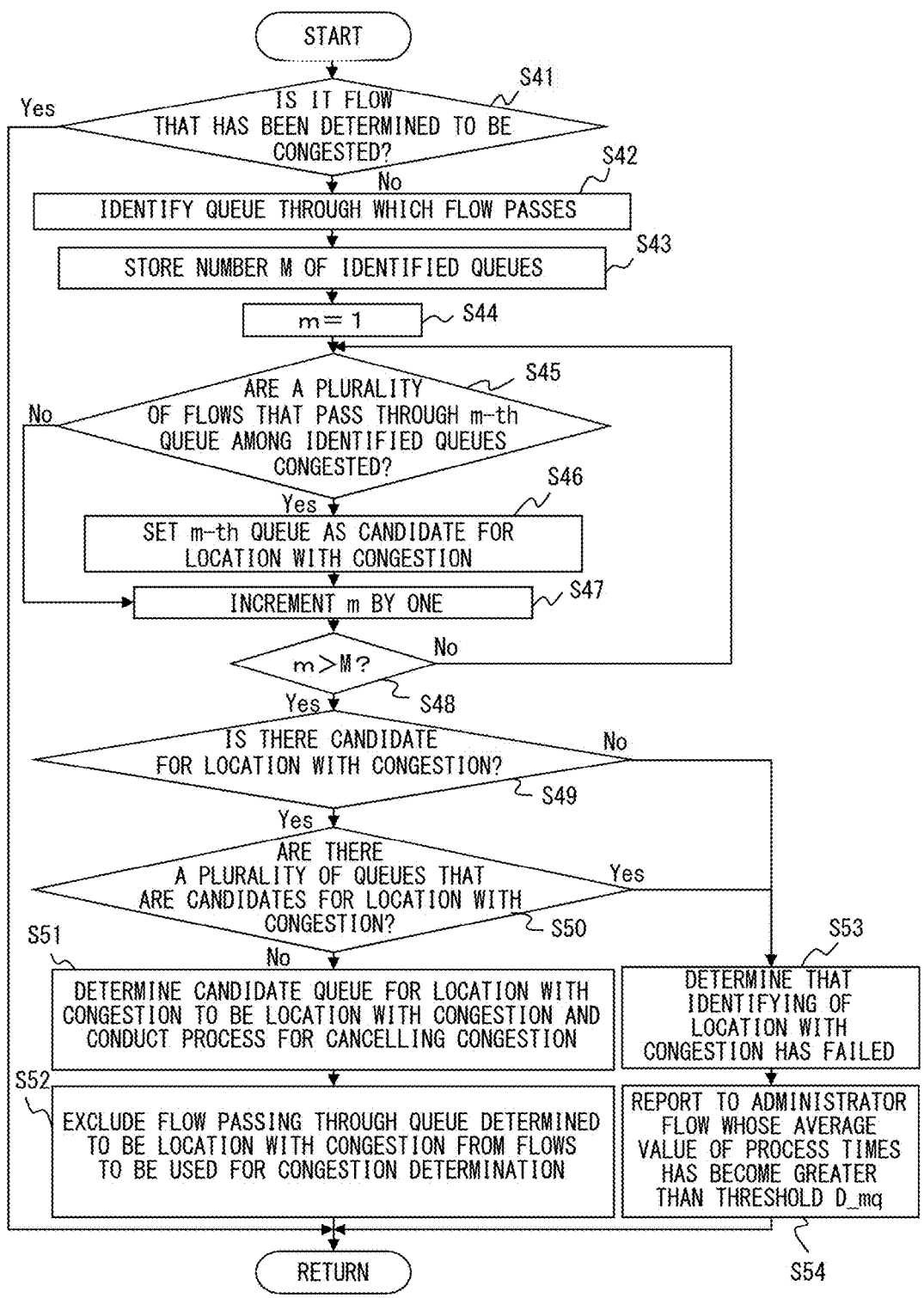
F I G. 2 1

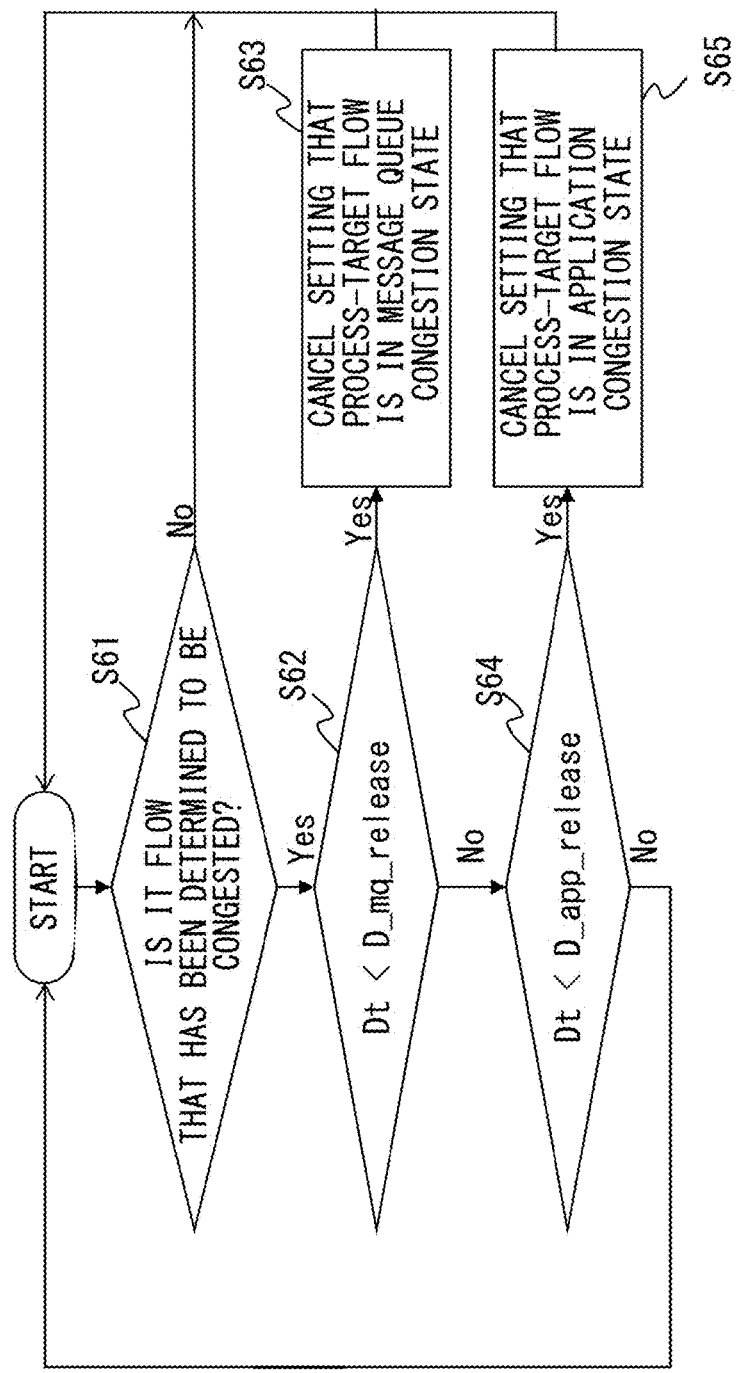
F I G. 22

ROUTE DETERMINATION APPARATUS AND TRANSFER ROUTE DETERMINATION METHOD

CROSS-REFERENCE TO RELATED APPLICATION

This application is based upon and claims the benefit of priority of the prior Japanese Patent Application No. 2014-112361, filed on May 30, 2014, the entire contents of which are incorporated herein by reference.

FIELD

The embodiments discussed herein are related to a method of transferring a packet in a network including a plurality of devices.

BACKGROUND

In recent years, Software Defined Networking (SDN), which is a technique used for constructing virtual network that uses software, has gathered attention. According to SDN, a device referred to as a controller controls devices (nodes) that transfer data in a network. For example, a node such as a switch in a network uses a transfer rule obtained from the controller so as to conduct a transfer process of a received packet. When an undefined packet, which it is not possible to process by using the transfer rule, has been received, the node reports the information of the received packet to the controller, and thereby obtains information for identifying the processing method for that packet from the controller. As described above, the controller controls transfer processes in a network in a centralized manner, sometimes making processes in the controller a bottleneck. Against this background, a controller system is proposed in which a plurality of controllers are included in a network and the plurality of controllers conduct processes as logically one controller.

FIG. 1 illustrates an example of a controller system. Nodes 6 (6a through 6i) included in a wide area network 3 conduct a transfer process of packets in accordance with a transfer rule obtained from a controller system 1. The wide area network 3 is connected to an arbitrary number of LANs such as Local Area Networks (LANs) 4a and 4b on an as-needed basis. The controller system 1 includes a controller cluster 8, a messaging system 5 and an application cluster 15. Control devices 2 (2a through 2d) include undefined packets received from the node 6 in control messages that are used in the controller system 1, and transfer the messages to a device in the messaging system 5. In the example illustrated in FIG. 1, the messaging system 5 includes transfer devices 10 (10a through 10c). Each of the transfer devices 10 transfers a message received from the control device 2 to processing devices 20 (20a through 20d) in the application cluster 15. The processing devices 20 process control messages and transmit the process results to the transfer devices 10 and the control devices 2, and the control devices control the nodes 6 in accordance with the process contents. Note that while the control device 2 is connected to the messaging system 5 in order to facilitate the understanding of the illustration of FIG. 1, it is assumed that each control device 2 (2a through 2d) may access arbitrary transfer devices 10 in the messaging system 5. Similarly, it is assumed that each transfer device may access arbitrary processing device 20 in the application cluster 15. When it is assumed for example that the node 6a has transmitted an undefined packet to the control device 2a, the control device 2a includes the received undefined packet in a control message for internal processes and requests, via the transfer device 10a, that the processing device 20b conduct the process of the control message, and the processing device 20b transmits the process result to the control device 2a via the transfer device 10b. The control device 2a controls the node 6a based on the obtained process result, and the node 6a conducts a transfer process of the packet based on the control content.

Note that the controller system 1 illustrated in FIG. 1 is an example and the numbers of the control devices, the transfer devices and the processing devices included in the controller system 1 may change arbitrarily in accordance with implementations.

As related arts, the following documents are known.
[Non Patent Document 1] "Study of Distributed Network Controller and Development of Benchmark Tool for the Controller in SDN" by Shimizu Sho, Yamada Akiko and Somiya Toshio, The Institute of Electronics, Information and Communication Engineers, General Conference, Institute of Electronics, Information and Communication Engineers, BS-2-4, p. S130-131, March 2013
[Non Patent Document 2] "Study on Scalable Messaging System for Distributed SDN Controller" by Shimizu Sho, Yamada Akiko and Somiya Toshio, IEICE Technical Report, The Institute of Electronics, Information and Communication Engineers, vol. 113, no. 472, NS2013-212, pp. 207-212, April 2014

In a controller system that uses a distributed network controller, transfer routes of messages and processing devices that process the messages are to be changed when congestion has occurred in a processing device or a transfer device included in the distributed network controller. However, because there is not a method of identifying the location at which congestion has occurred, it is not possible to resolve the congestion efficiently.

SUMMARY

According to an aspect of the embodiments, a route determination apparatus is an apparatus in a communication system including a plurality of transfer devices, a plurality of processing devices and a control device. The route determination apparatus includes a processor and a network connection device. The network connection device transmits and receives messages. The processor obtains a process time, which is a period of time taken for processing a control message when the control device requests that a target processing device, selected from among the plurality of processing devices, process a control message including a process-target packet. When the process time has become longer than a first threshold, the processor determines which of a first congestion and a second congestion has occurred based on whether or not the process time has become longer than a second threshold, which is greater than a first threshold. Here, the first congestion occurs in the transfer devices used for a communication between the control device and the target processing device and the second congestion occurs in the target processing device. The network connection device transmits a request message requesting that a transfer route for which it has been determined that the control message is not processed in a device in which the congestion has occurred be set.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 illustrates an example of a hardware configuration;

FIG. 8 illustrates an example of a transfer route table;

FIG. 9 illustrates an example of information of transfer destinations held by each device;

FIG. 11 illustrates an example of a threshold information table;

FIG. 12 illustrates a table of an example of information held by a determination unit;

FIG. 13 illustrates a variation example of route information used when congestion has occurred in a processing device;

FIG. 15 illustrates a table illustrating an example of information held by a determination unit;

FIG. 16 illustrates a variation example of route information used in a case when congestion has occurred in a transfer device;

FIG. 17 illustrates a variation example of a transfer route in a case when congestion has occurred in a transfer device;

FIG. 19 illustrates a flowchart for explaining an example of a failure determination process;

FIG. 21 illustrates a flowchart for explaining an example of a method of determining the occurrence of congestion in a transfer device; and FIG. 22 illustrates a flowchart for explaining an example of a process of resolving congestion.

DESCRIPTION OF EMBODIMENTS

Figure 1:
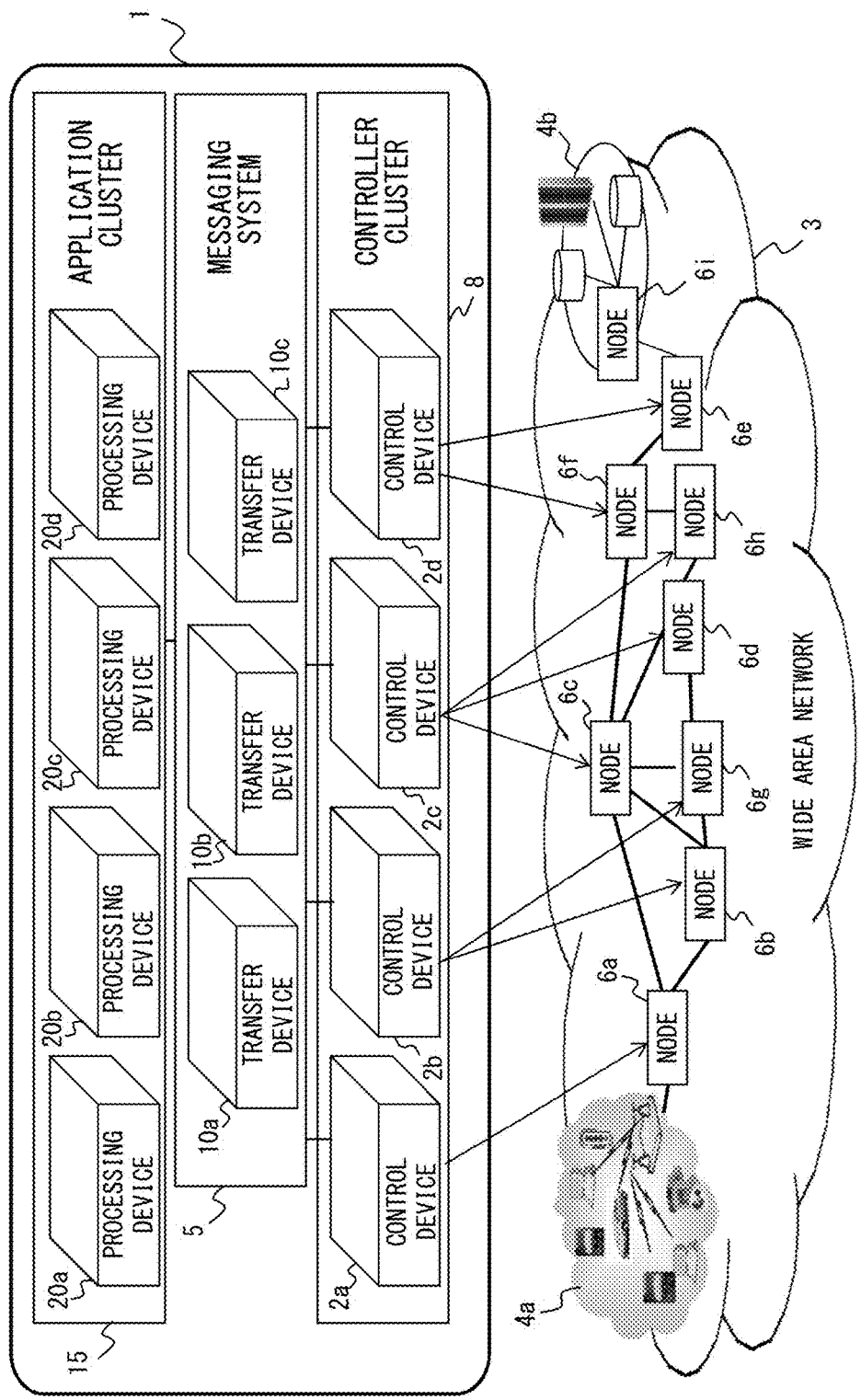
FIG. 1 illustrates an example of a controller system.
Figure 2:
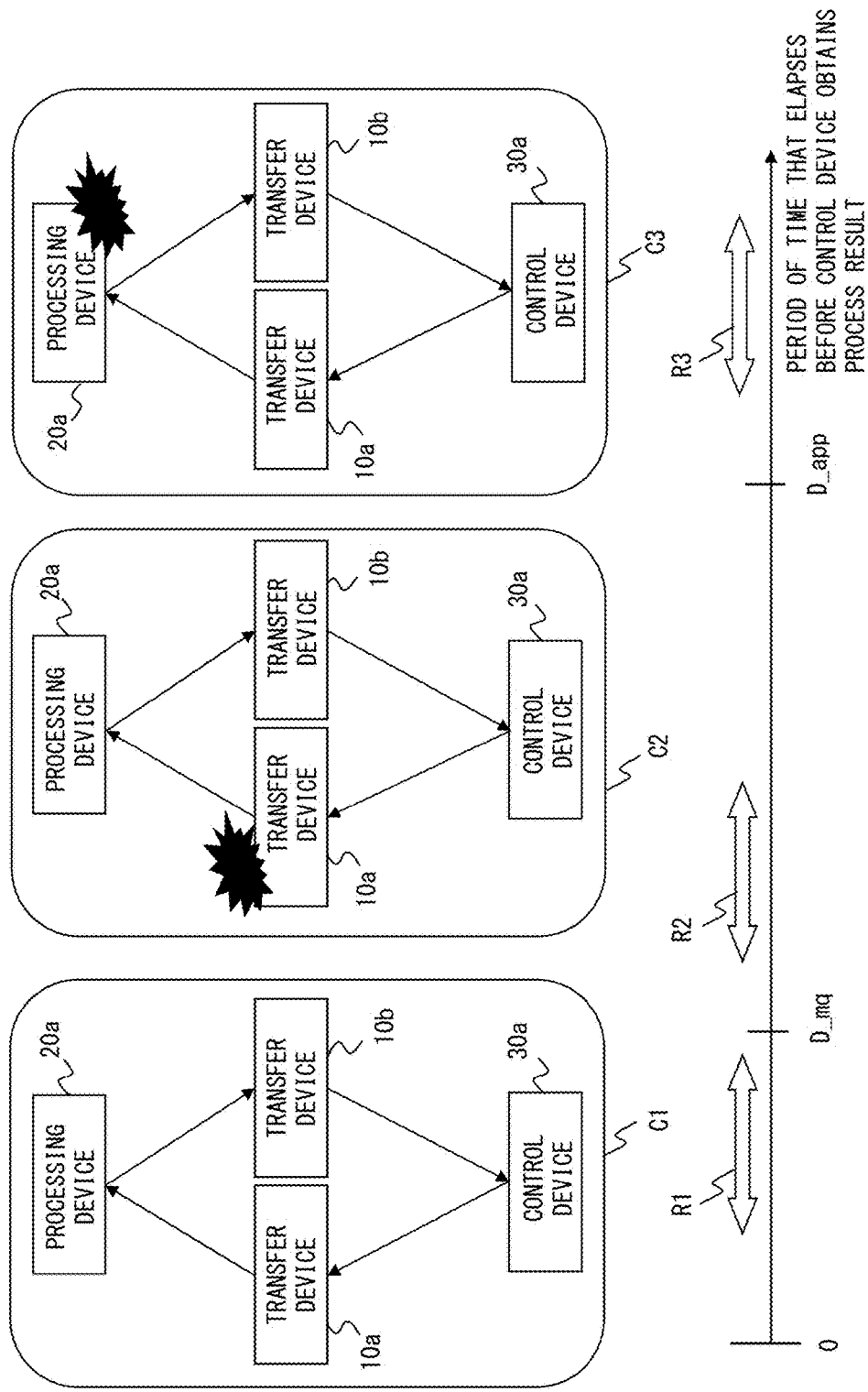
FIG. 2 illustrates an example of a process for determining a location at which congestion has occurred.

FIG. 2 illustrates an example of a process for determining the location at which congestion has occurred. In the explanations below, it is assumed that a control device 30 has received an inquiry packet including an undefined packet etc. from the node 6 and includes the undefined packet etc. in a control message for internal processes. Further, it is also assumed that the controller system 1 includes a coordination device 50 (see FIG. 3 etc.) that determines a transfer route for control messages etc. The control device 30 measures a period of time that elapses between when a request that the processing device 20 conduct a process of the control message received from the node 6 is made and when the process result of the control message is obtained. The length of the period of time that elapses between when the control device 30 makes a request for the process of the control message and when the process result is obtained may be considered to be a period of time that is taken by the process of the control message in the controller system 1. Accordingly, in the explanations below, the period of time that elapses between when the control device 30 makes a request for the process of the control message and when the process result is obtained will also be referred to as a "process time". The control device 30 reports the process time to the coordination device 50.

In order to facilitate the understanding of the illustration, cases C1 through C3 appearing in FIG. 2 illustrate a route for transferring a control message and a route for transferring the process result of the control message in a situation where the control device 30a that has received an inquiry packet from one of the nodes 6 requests that the processing device 20a conduct the process of the control message including the inquiry packet. As illustrated in case C1, the control device 30a requests, via the transfer device 10a, that the processing device 20a conduct a process of a control message. Also, the processing device 20a transmits the process result of the control message to the control device 30a via the transfer device 10b. When congestion has not occurred in any of the transfer devices 10a, 10b and the processing device 20a, the control device 30a may obtain a process result within time range R1 after requesting that the processing device 20a conduct the process of the control message.

When congestion has occurred in the transfer device 10a as illustrated in case C2, a longer process time is taken because a longer time is taken for the transfer process in the transfer device 10a than in case C1. Case C2 illustrates an example of a situation where congestion has occurred in the transfer device 10a, while when congestion has occurred in the transfer device 10b, a longer process time is taken than in case C1 similarly. Time range R2 is an example of the distribution of times between when the control device 30a requests that the processing device 20a conduct processes of control messages and when the process results are obtained in the case that congestion has occurred in the transfer device 10a or the transfer device 10b but not in the processing device 20a.

Next, as illustrated in case C3, a situation is discussed in which congestion has occurred in the processing device 20a. A delay that is caused by congestion occurring in the processing device 20a is longer than a delay caused by congestion occurring in the transfer device 10a, the transfer device 10b or the like. Accordingly, when congestion has occurred in the processing device 20a, a longer process time is taken than in cases C1 or C2. In the example illustrated in FIG. 2, when congestion has occurred in the processing device 20a, the distribution of the times between when the control device 30a requests that the processing device 20a process a control message and when the process result is received is as depicted as time range R3.

The coordination device 50 holds threshold D_mq and threshold D_app. Threshold $D_{13}$ mq is set to a value equal to or greater than the maximum value of a process time used in a case when congestion has not occurred in any of the transfer device 10a, the transfer device 10b and the processing device 20a. Threshold D_app is a value equal to or greater than the maximum value of a process time used in a case where congestion has occurred in either the transfer device 10a or the transfer device 10b and is a value smaller than the maximum value of a process time used in a case when congestion has occurred in the processing device 20a.

The coordination device 50 holds the connection topology information of the controller system 1 and also holds the transfer route of the control message received by each control device 30 and the transfer route of the process results.

The coordination device 50 uses the process time reported by the control device 30a and determines which of the devices to which the control message received by the control device 30a has been transferred, congestion has occurred in. In other words, when the process time has become longer than threshold D_mq, the coordination device 50 determines that congestion has occurred in one of the devices to which the control message has been transferred. Further, the coordination device 50 determines which of the transfer devices 10 (10a and 10b) and the processing devices 20 the congestion has occurred in based on whether or not the process time has become longer than threshold D_app. When the process time is equal to or shorter than threshold D_app, the coordination device 50 determines that there is a high possibility that congestion has occurred in one of the transfer device 10a and the transfer device 10b. When the process time has become greater than threshold D_app, the coordination device 50 determines that there is a high possibility that congestion has occurred in the processing device 20. The coordination device 50 determines a transfer route for the control message received by the control device 30a and a transfer route for the process result in such a manner that the routes do not include the device for which the high possibility of congestion occurrence was determined. When for example as illustrated in case C2, the coordination device 50 has determined that there is a high possibility that congestion has occurred in the transfer device 10a, the coordination device 50 calculates a transfer route for the control device 30a to communicate with the processing device 20a via the transfer device 10c. When for example as illustrated in case C3, the coordination device 50 has determined that there is a high possibility that congestion has occurred in the processing device 20a, the coordination device 50 obtains a transfer route for the control message and a transfer route for the process result in such a manner that the control device 30a requests that the processing device 20b instead of the processing device 20a process the control message. The coordination device 50 conducts setting processes on an as-needed basis for devices in the controller system 1 so that communications are conducted by using the obtained routes.

As described above, when the coordination device 50 uses the process time of a control message and predicts the location of the occurrence of congestion so as to set a transfer route that avoids the location of the occurrence of the congestion, congestion is resolved efficiently, leading stable operations of the controller system 1.

Although explanations have been given, by referring to FIG. 2, for an example of a case where the occurrence of congestion is identified when a delay occurred in a process time measured by the control device 30 for the first time, it is also possible to determine that congestion has occurred when a plurality of delays have been detected in order to increase the detection accuracy. It is also possible for the coordination device 50 to determine that congestion has occurred when a process time is equal to or longer than threshold D_mq. Similarly, it is also possible for the coordination device 50 to determine that congestion has occurred in the processing device 20 when a process time is equal to or longer than threshold D_app.

<Apparatus Configuration>

Figure 3:
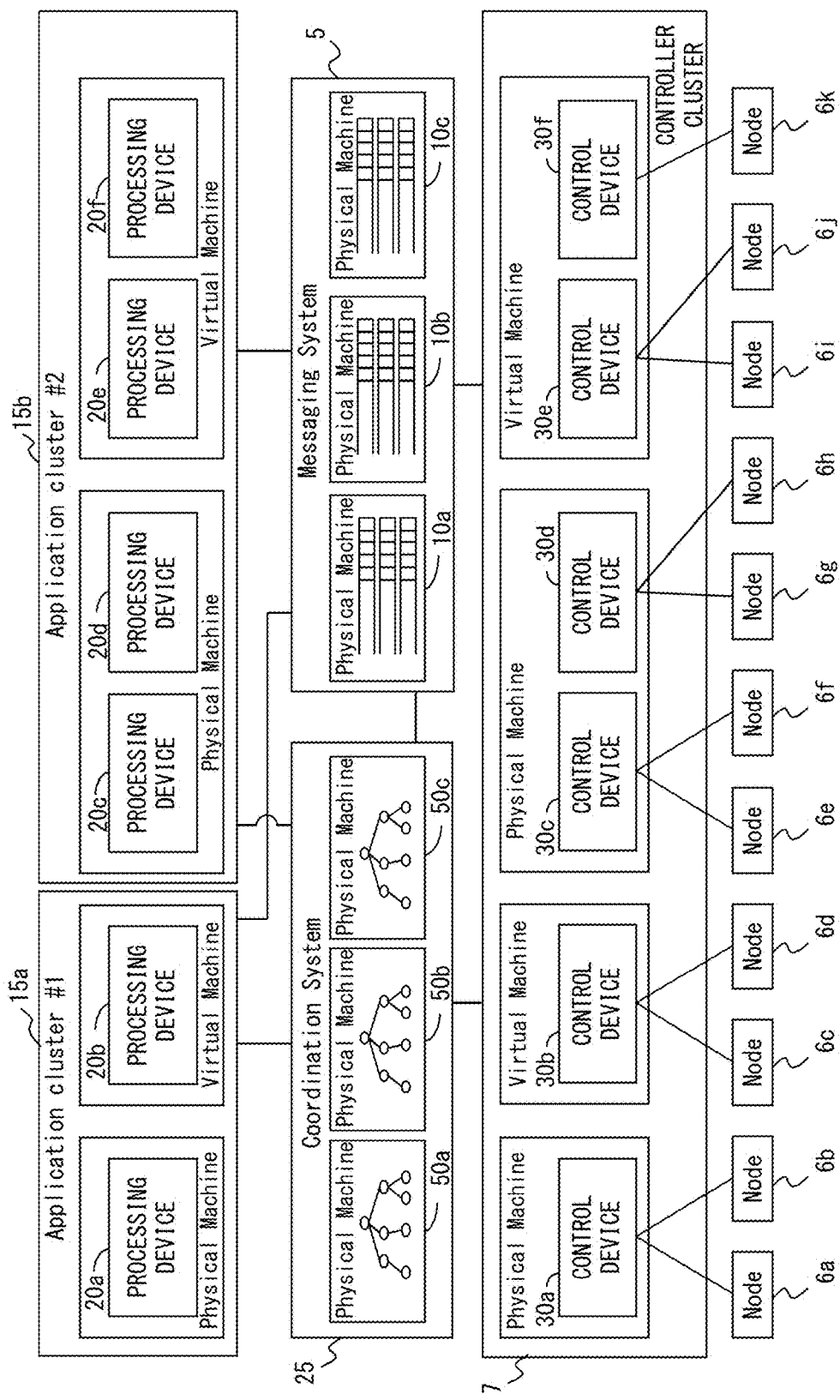
FIG. 3 illustrates an example of a network.

FIG. 3 illustrates an example of a network. In the network illustrated in FIG. 3, devices other than the nodes 6 (6a through 6k) are included in the controller system 1. In the example illustrated in FIG. 3, the controller system 1 includes a coordination system 25, application clusters 15 (15a and 15b), a messaging system 5 and a controller cluster 7. It is assumed in this example that the application cluster 15a and the application cluster 15b conduct processes by using different types of application software. It is assumed for example that the application cluster 15a conducts a process related to the monitoring of the status of a network and the application cluster 15b conducts route calculations. Further, it is also assumed that the messaging system 5, the controller cluster 7, the coordination system 25 and the application clusters 15 are connected to each other in such a manner that they may perform communications on an as-needed basis.

In the example illustrated in FIG. 3, the controller cluster 7 includes the control devices 30 (30a through 30f). The messaging system 5 includes the transfer devices 10 (10a through 10c), and the coordination system 25 includes the coordination devices 50 (50a through 50c). Further, the application cluster 15a includes the processing devices 20a and 20b, and the application cluster 15b includes the processing device 20c through 20f. It is assumed that the control devices 30, the transfer devices 10, the coordination devices 50 and the processing devices 20 maybe realized either by a physical machine or a virtual machine. It is also possible that both a virtual machine and a physical machine used for forming the controller system 1 may realize one or more control device 30 or processing device 20, or the like. In the example illustrated in FIG. 3, one physical machine realizes the control device 30a while the control device 30c and the control device 30d are realized by a physical machine that is different from the physical machine realizing the control device 30a. The control device 30b is realized by one virtual machine while the control device 30e and the control device 30f are realized by one virtual machine. Also, the coordination devices 50a through 50c are realized by one physical machine and the transfer devices 10a through 10c are also realized by one physical machine. Also, FIG. 3 is exemplary and the numbers of the transfer devices 10, the processing devices 20, the control devices 30 and the coordination devices 50 included in the controller system 1, may be changed arbitrarily. It is also assumed that one physical machine may realize one or more of the transfer devices 10, the processing devices 20, the control devices 30 and the coordination devices 50 according to implementations.

It is assumed that each of the nodes 6a through 6k communicate with one or more of the control devices 30a through 30f. Also, each of the nodes 6a through 6k sets, as the master control device 30, one of the control devices 30 that are communicating with it, and also sets, as slaves, the other control devices 30 that are communicating with it. Each node 6 transmits an inquiry packet to the control device 30 set as the master, and is controlled by using an Openflow protocol from the master control device 30. In FIG. 3, in order to facilitate the illustration, routes between the nodes 6 and their slave control devices 30 are not illustrated.

Figure 4:
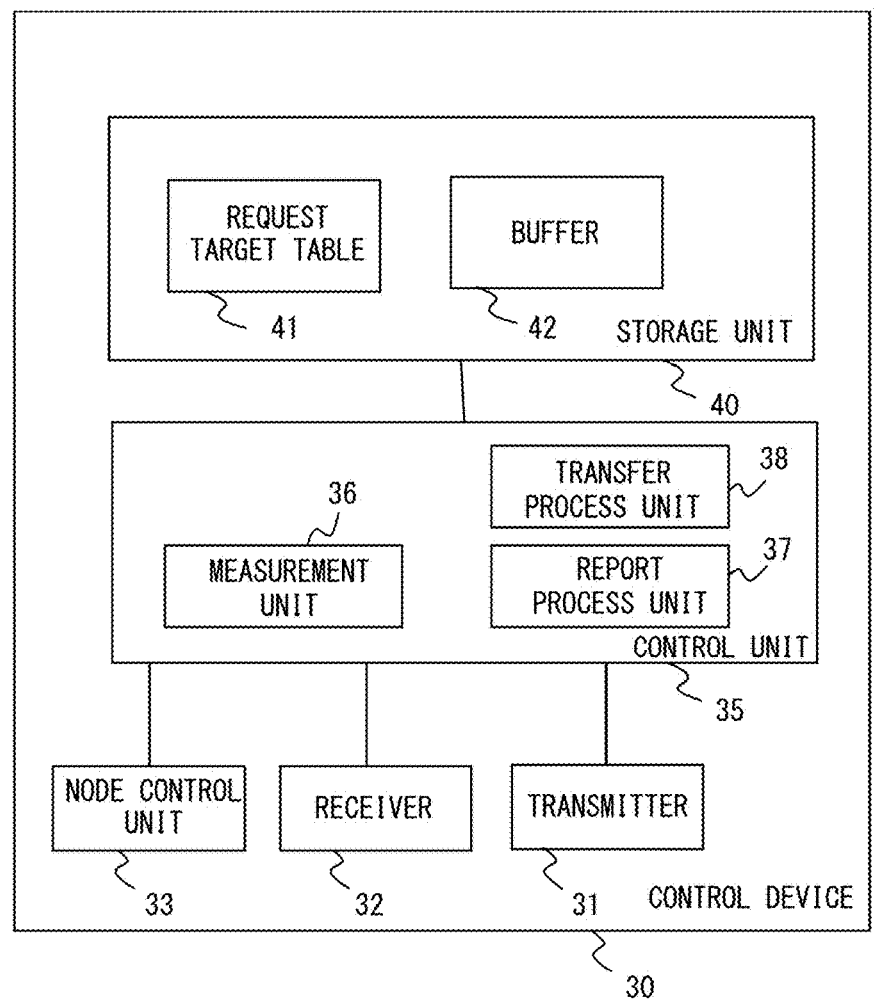
FIG. 4 illustrates an example of a configuration of a control device.

FIG. 4 illustrates an example of a configuration of the control device 30. The control device 30 includes a transmitter 31, a receiver 32, a control unit 35, a storage unit 40 and a node control unit 33. The control unit 35 includes a measurement unit 36, a report process unit 37 and a transfer process unit 38. The storage unit 40 stores a request target table 41, and also operates as a buffer 42.

The transmitter 31 transmits, to a different device in the controller system 1, a message input from the control unit 35. The receiver 32 receives a message from a different device in the controller system 1. The receiver 32 stores a received message in the buffer 42 on an as-needed basis. The transfer process unit 38 conducts a process for transmitting an inquiry packet received from the node 6 to a transmission destination determined based on the type of the packet. For conducting this process, the transfer process unit 38 refers to the request target table 41. Examples of the request target table 41 and the process conducted by the transfer process unit 38 will be described later. The transfer process unit 38 reports to the measurement unit 36 the timing of transferring a control message to the processing device 20. The measurement unit 36 monitors the timing at which the control device 30 receives the process result of a control message so as to measure the process time for each control message. The report process unit 37 periodically generates a report message for reporting a process time, and reports a report to the coordination device 50 via the transmitter 31. The report process unit 37 holds the identifier of the coordination device 50 to which the control device 30 reports a process time. The node control unit 33 controls each node by using an Openflow protocol etc. based on the reception of inquiry packets from the nodes 6 and information transmitted from the processing devices 20.

Figure 5:
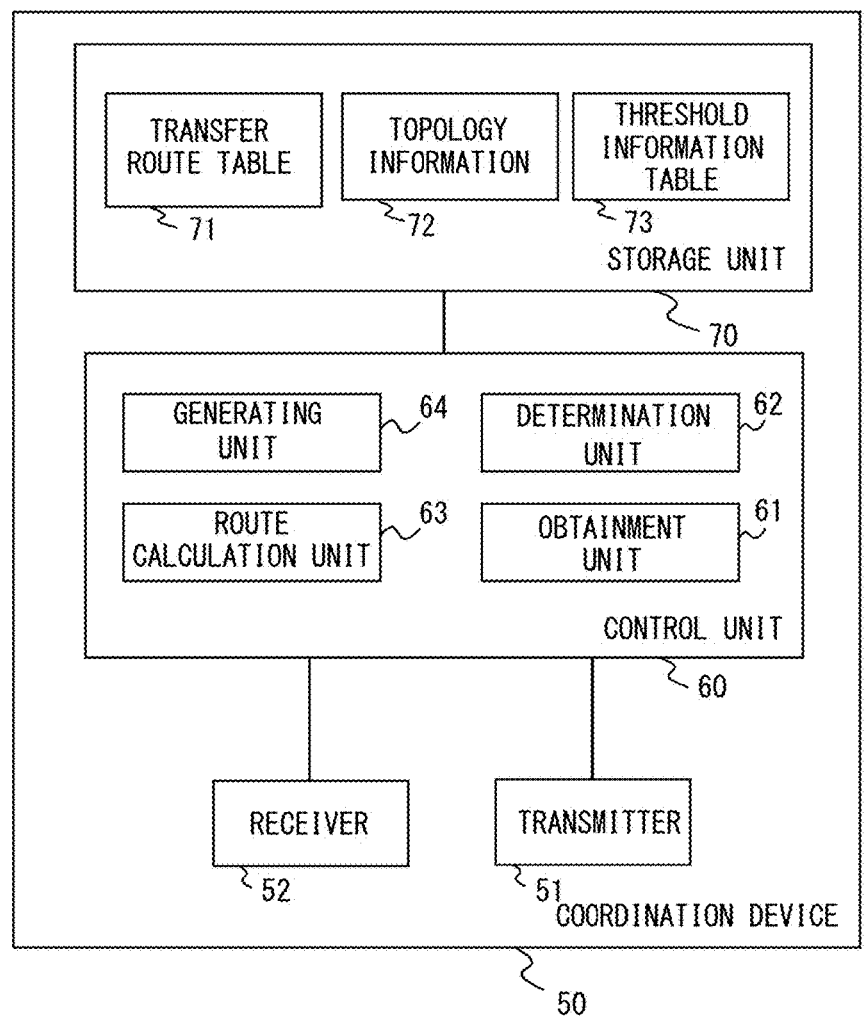
FIG. 5 illustrates an example of a configuration of a coordination device.

FIG. 5 illustrates an example of a configuration of the coordination device 50. The coordination device 50 includes a transmitter 51, a receiver 52, a control unit 60 and a storage unit 70. The control unit 60 includes an obtainment unit 61, a determination unit 62, a route calculation unit 63 and a generating unit 64. Further, the storage unit 70 includes a transfer route table 71, topology information 72 and a threshold information table 73.

The transmitter 51 transmits a control message to a different device in the controller system 1. The receiver 52 receives a control message from a different device in the controller system 1. When for example the receiver 52 has received a control message from the control device 30, the receiver 52 outputs the control message to the obtainment unit 61.

The obtainment unit 61 uses a control message so as to obtain a process time measured by each of the control devices 30. The determination unit 62 compares the process time and threshold D_mq, and thereby determines whether or not the process of the control message is being conducted normally. When a process time has become longer than threshold D_mq, the determination unit 62 uses the result of comparison between the process time and threshold D_app so as to determine the location at which there is a possibility of the occurrence of congestion. These thresholds are recorded in the threshold information table 73. Examples of the threshold information table 73 will be described later.

The route calculation unit 63 uses the result of determination made by the determination unit 62 so as to perform a route calculation for transferring a control message and process results by using a route in which congestion has not occurred. For this calculation, the route calculation unit 63 may use the transfer route table 71, the topology information 72, etc. on an as-needed basis. The transfer route table 71 stores the information representing the transfer route that is used currently, and the topology information 72 stores information representing the topology of a control network etc. Examples of the transfer route table 71 will be described later. The generating unit 64 generates a control message used for reporting, to the control device 30 etc., route calculation results obtained by the route calculation unit 63.

FIG. 6 illustrates an example of a hardware configuration of the control device 30 and the coordination device 50. Hardware configurations of the transfer device 10 and the processing device 20 are similar to that illustrated in FIG. 6. Each of the control devices 30 and the coordination devices 50 includes a processor 101, a memory 102, a bus 103 and a network connection device 104. The bus 103 connects the processor 101, the memory 102 and the network connection device 104 in such a manner that the transmission and reception of data is possible between each other. The network connection device 104 conducts communications with a network 105.

In the control device 30, the processor 101 operates as the control unit 35 and the memory 102 operates as the storage unit 40. The network connection device 104 realizes the transmitter 31 and the receiver 32. The node control unit 33 is realized by the processor 101 and the network connection device 104. In the coordination device 50, the processor 101 realizes the control unit 60. The memory 102 operates as the storage unit 70. The network connection device 104 realizes the transmitter 51 and the receiver 52.

>Embodiments≤

Figure 7:
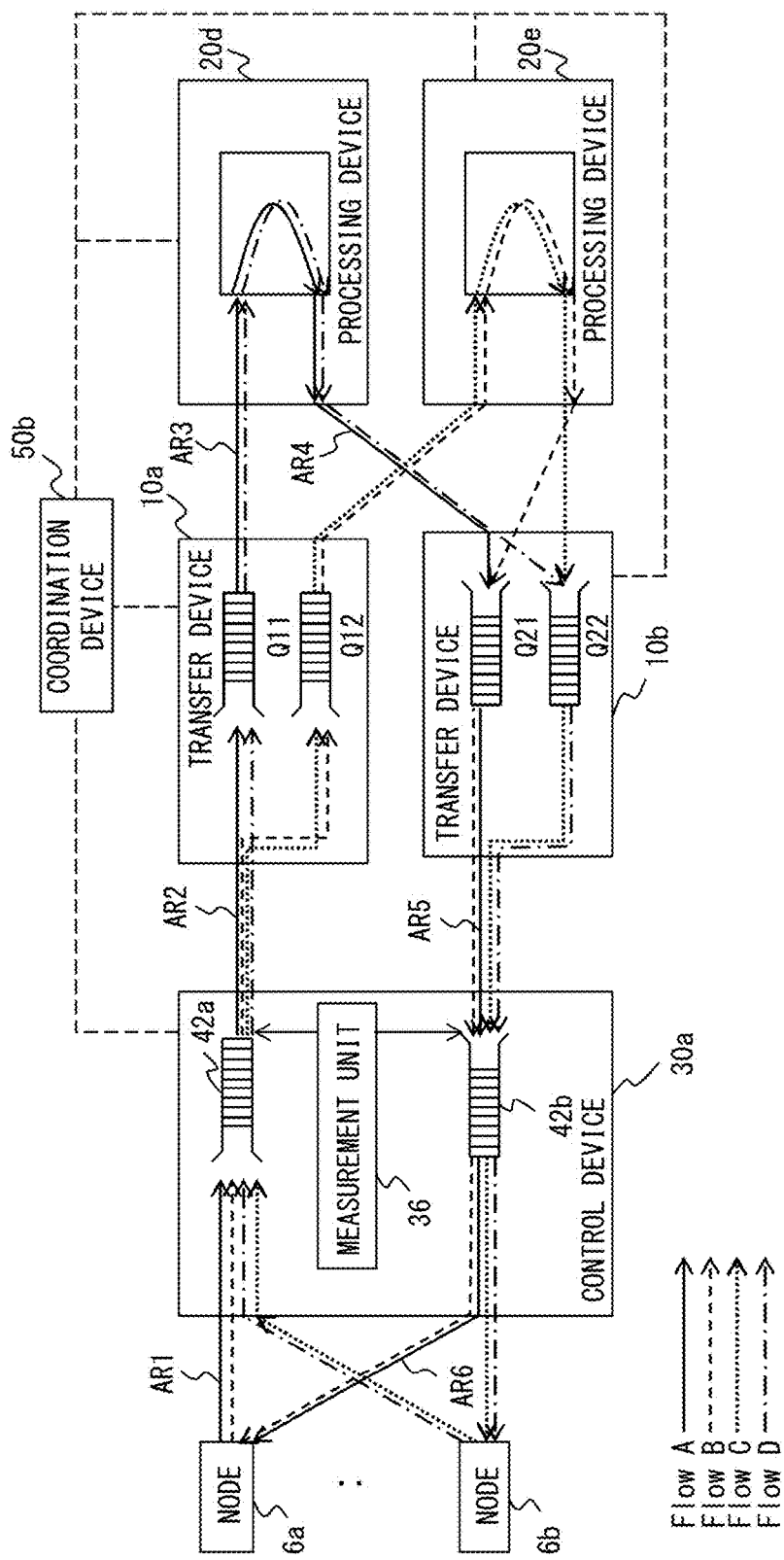
FIG. 7 explains a specific example of a process of a control message.

FIG. 7 explains a specific example of a process of a control message. FIG. 7 illustrates in detail devices that process a control message related to flows A through D. In the following explanations, "flow" does not refer to a flow of data exchanged between node devices but refers to a flow of a control message for controlling the controller system 1 and includes an inquiry packet exchanged between nodes and the control devices. In the following example, it is assumed that flows A and B are flows of control messages used by the node 6a to inquire a process of an undefined packet etc. from the control device 30a. It is also assumed that flows C and D are flows of control messages used by the node 6b to inquire a process of an undefined packet etc. from the control device 30a. Also, in the explanations below, an example is a used in which flows A and D are flows of a control message for inquiring about the process contents of audio packets, and flows B and C are flows of a control message for inquiring about the process contents of image packets. Note that an arbitrary message including a Packet-in message of Openflow maybe used as a control message for inquiring about the process contents of an undefined packet etc.

It is assumed in the example illustrated in FIG. 7 that the control device 30a, the transfer device 10a, the transfer device 10b, the processing device 20d and the processing device 20e process flows A through D. In the explanations below, a case is explained as an example in which a coordination device 50b coordinates a transfer route of a control message the process of which is requested by the control device 30a. The dotted lines in FIG. 7 represent part of a control network used for communications between the coordination device 50b and respective devices. In the explanations below, in order to clarify the directions of transfer, the direction in which a control message is transferred to the processing devices 20 may be referred to as the "uplink direction" and the direction in which the process result of a control message maybe transferred to the control devices 30 is referred to as the "downlink direction" in some cases. In each of the transfer devices 10, it is assumed that queues used for uplink transfer processes are uniquely associated with combinations of the transfer-destination processing devices 20 and application programs used for processes. Similarly, it is also assumed that queues used for downlink transfer processes are uniquely associated with the control devices 30 as the transfer destinations of the process results.

FIG. 8 illustrates an example of the transfer route table 71. FIG. 8 illustrates an example of the transfer route table 71 held by the coordination device 50*b* when the coordination device 50*b* sets the transfer route illustrated in FIG. 7 for flows A through D. The transfer route table 71 is generated by the route calculation unit 63.

In the example illustrated in FIG. 7 and FIG. 8, the coordination device 50*b* has set a transfer route in such a manner that flows A and D are transferred to the processing device 20*d* via a message queue 11 of the transfer device 10*a*. Also, the coordination device 50*b* has set a transfer route in such a manner that flows B and C are transferred to the processing device 20*e* via message queue Q12 of the transfer device 10*a*. Further, the process result obtained in the processing device 20*d* for flow A and the process result obtained in the processing device 20*e* for flow B are transferred to the control device 30*a* via a message queue Q21 of the transfer device 10*b*. Also, the process result obtained in the processing device 20*d* for flow D and the process result obtained in the processing device 20*e* for flow C are transferred to the control device 30*a* via message queue Q22 of the transfer device 10*b*.

FIG. 9 illustrates an example of information of transfer destinations held by each device. When flows are processed as illustrated in FIG. 7, the generating unit 64 of the coordination device 50*b* has transmitted a request message in advance to the control device 30*a* so that contents of the request target table 41-1 are set. Similarly, it is also assumed that request messages representing the contents of tables T1, T2, T3 and T4 have been transmitted to the transfer device 10*a*, the transfer device 10*b*, the processing device 20*d* and the processing device 20*e*, respectively from the coordination device 50*b* in advance.

Hereinafter, explanations are given to an example of a process executed when each device holds information of transfer destinations as illustrated in FIG. 9, in such a manner that the explanations are given separately to the process of each flow and the measurement of process times, information held by the coordination device 50, the detection and avoidance of congestion that has occurred in the processing device 20 and the detection and the avoidance of congestion that has occurred in the transfer device 10.

(1) Process of Each Flow and the Measurement of Process Times

The nodes 6*a* and 6*b* transmit, to the control device 30*a*, a packet that inquires about process contents for an audio packet and an image packet. For this purpose, as illustrated in FIG. 7, the node 6*a* transmits flows A and B to the control device 30*a* and the node b transmits flows C and flow D to the control device 30*a*. Hereinbelow, examples of processes of the respective flows are explained by using, as an example, a case when a control message included in flow A has been transmitted from the node 6*a* to the control device 30*a*.

As depicted by AR1 illustrated in FIG. 7, the control device 30*a* receives an inquiry packet such as an undefined packet etc. from the node 6*a*. The node control unit 33 includes the received inquiry packet in a control message for internal control, and stores the message in the buffer 42*a*. The transfer process unit 38 reads the control message from the buffer 42*a* and determines to which of the flows the read control message belongs. For example, when the control message is a Packet-in message, the transfer process unit 38 determines the type of the inquiry about process contents.

Because a Packet-in message includes as least part, such as the header, of a packet that is the target of the inquiry of process contents, the transfer process unit 38 may determine the type of the inquiry of the packet. Accordingly, the transfer process unit 38 determines to which of the processing devices the message is to be transmitted based on the combination of the inquiry packet included in the control message and the type of the inquiry, and also determines which of the flows A through D is to be used. Next, the transfer process unit 38 identifies the transfer device 10 as a transfer destination by referring to the request target table 41.

As illustrated in a request target table 41-1 illustrated in FIG. 9, the application types, the identification information of the transfer-destination transfer devices 10 and the identification information of uplink message queues are stored in a state that they are associated with the identifiers of the flows. An application type is information representing the type of the application software that processes the control message included in the associated flow. In the following example, it is assumed that the control device 30*a* holds the request target table 41-1 illustrated in FIG. 9 and the control message included in flow A or D is processed by application AP1 (the processing device 20*d*). Similarly, the control message included in flow B or C is processed by application AP2 (the processing device 20*e*). Further, queue Q11 of the transfer device 10*a* is specified by the request target table 41-1 as the transfer destination of the control message included in flow A or D. Similarly, queue Q12 of the transfer device 10*a* is specified as the transfer destination of the control message included in flow B or C.

When the type of the flow has been identified, the transfer process unit 38 identifies the transfer destination by referring to the request target table 41-1. It is assumed that the transfer process unit 38 has determined that the control message read from the buffer 42*a* has been included in flow A. Then, the transfer process unit 38 uses the request target table 41-1 so as to determine the queue Q11 of the transfer device 10*a* to be the transfer destination of the control message included in flow A, and outputs, to the transmitter 31, the read control message with information indicating that the transfer destination is the transfer device 10*a*. When this process is conducted, it is also possible for the transfer process unit 38 to add identification information (message identification information) for uniquely identifying an input control message. Further, the transfer process unit 38 outputs, to the measurement unit 36, the control message and the identification information of the flow that includes the control message, and thereby reports, to the measurement unit 36, the transmission of the control message.

When a control message has been input, the measurement unit 36 extracts the message identification information from the control message. Message identification information is arbitrary information that may uniquely identify a control message. For example, the measurement unit 36 may use, as message identification information, the sequence number, the message ID, etc. that are included in the header of a control message. The measurement unit 36 starts the measurement of the time elapsed since the time when the fact that the control message is transferred to the transfer device 10 in such a manner that the measurement is associated with the obtained message identification information and the identification information of the flow including the control message.

As depicted by AR2 in FIG. 7, the transmitter 31 transmits an input control message to the transfer device 10*a* that is the specified transfer destination. The transfer device 10*a* obtains the information of the storing destination included in the control message received from the control device 30*a*. At that moment, the control message received by the transfer device 10*a* includes information indicating that the storing destination is queue Q11. Then, the transfer device 10*a* stores the received control message in queue Q11.

Table T1 illustrated in FIG. 9 associates the transfer-source control device, the application type and the transfer-destination processing device for each queue used by the transfer device 10*a* to hold an uplink control message. In the column of transfer-source control device, information of the control devices 30 serving as the transfer sources of the control messages that specify the corresponding queues as storage destinations is stored. An application type is information representing the type of the application software used for processing a control message stored in the corresponding queue. A transfer-destination processing device is a transfer destination of a control message stored in the corresponding queue. For example, queue Q11 in the transfer device 10*a* is associated with the process using application AP1 in the processing device 20*d*, and the control device 30*a* has been set as the transmission source. In other words, the transfer device 10*a* uses queue Q11 for relaying a control message processed by application AP1 from the control device 30*a* to the processing device 20*d*. Similarly, the transfer device 10*a* uses queue Q12 for relaying a control message processed by application AP2 from the control device 30*a* to the processing device 20*e*. The transfer device 10*a* uses information in table T1 so as to transfer the control message stored in queue Q11 to the processing device 20*d*.

Because a control message of flow A is transmitted to the processing device 20*d* as depicted by AR3 illustrated in FIG. 7, the processing device 20*d* receives the control message. It is assumed that the processing device 20*d* has been set to process, by using application AP1, the control message stored in queue Q11 of the transfer device 10*a*. The control message received by the processing device 20*d* includes information indicating that the control message was stored in queue Q11, and accordingly the control message is processed by application AP1. Note that it is assumed that when the processing device 20*d* processes a control message, the processing device 20*d* also determines which of the flows includes the process-target control message. Also in the processing device 20*d*, the determination method of a flow to which a control message belongs is similar to that in the control device 30*a*.

Table T3 illustrated in FIG. 9 illustrates an example of transfer information held by the processing device 20*d*. For each flow, the transfer route of the result of the process of a control message is recorded. Each entry includes the information of the transmission-destination control device, the transfer device serving as the transfer destination of the process result and the downlink message queue. A downlink message queue is the identifier of a message queue used for reporting the process result to the control device 30 set as the report destination of the process result. When for example a control message included in flow D has been processed, the processing device 20*d* specifies queue Q22 of the transfer device 10*b* as the transfer destination in order to report the result to the control device 30*a*. When a control message included in flow A has been processed, the processing device 20*d* specifies queue Q21 of the transfer device 10*b* as a transfer destination in order to report the result to the control device 30*a*. In this example, because the processing device 20*d* has processed a control message included in flow A, the processing device 20*d* adds information indicating that the queue to be used for the storage in the transfer destination is queue Q21 to a control message representing the process result, and transmits the message to the transfer device 10*b*. Note that the control message representing the process result includes control message identification information for identifying the process-target control message and the identification information of the flow to which the process-target control message belongs.

As depicted by AR4 in FIG. 7, the transfer device 10*b* receives a control message including a process result from the processing device 20*d*. The transfer device 10*b* obtains the information of the storage destination included in the received control message. In this example, because the control message received by the transfer device 10*b* includes information indicating that the storage destination is queue Q21, the transfer device 10*b* stores the received control message in queue Q21.

Table T2 illustrated in FIG. 9 associates the transfer-source processing device 20 and the transfer-destination control device 30 for each queue used by the transfer device 10*b* to hold a downlink control message. In the column of transfer-source processing device 20, information of the processing devices 20 serving as the transfer sources of the control messages that specify the corresponding queues as the storage destination is stored. The transfer-destination control device 30 is a transfer destination of a control message stored in the corresponding queue. For example, queue Q21 in the transfer device 10*b* stores a control message addressed to the control device 30*a* input from the processing device 20*d* or the processing device 20*e*. Similarly, the transfer device 10*b* uses queue Q22 for storing a control message addressed to the control device 30*a* input from the processing device 20*d* or the processing device 20*e*. Accordingly, in the example of table T2, the transfer device 10*b* transfers to the control device 30*a* control messages stored in both queue Q21 and queue Q22.

As depicted by AR5 in FIG. 7, the control device 30*a* receives a control message including a process result from the transfer device 10*b*. The receiver 32 in the control device 30*a* outputs the received control message to the transfer process unit 38. The transfer process unit 38 extracts information for identifying the flow of the process-target control message from among control messages including the processing result and the control device controls the transmission-source node 6 based on the extracted information. For example, because the control device 30*a* has obtained an inquiry packet of flow A from the node 6*a*, when the transfer process unit 38 has received the control message of the process result regarding flow A, the control device controls the node 6*a* by using an Openflow protocol in accordance with the process result (AR6 in FIG. 7).

The transfer process unit 38 obtains the process result and reports the reception time of the control message including the process result to the measurement unit 36. The transfer process unit 38 also reports to the measurement unit 36 the obtainment of the process result in a state that the obtainment is associated with the control message identification information included in the received control message. The measurement unit 36 obtains the difference between the transmission time stored in a state that it is associated with the control message identification information input from the transfer process unit 38 and the reception time associated with the control message identification information, and treats the obtained value as the process time of the control message identified by the control message identification information. The measurement unit 36 outputs to the report process unit 37 the combination between the obtained process time and the flow including the control message for which the process time was obtained. When for example the process time for control message Pa1 in flow A is T1, the measurement unit 36 reports to the report process unit 37 that the process time of the control message of flow A is T1. The report process unit 37 holds the identifier of the communication-destination coordination device 50b in advance and transmits the process time of each flow to the coordination device 50b.

In the explanations above, a control message of flow A has been used to explain the processes of a control message, the obtainment of a process time and the reporting of the process time to the coordination device 50b, whereas processes are conducted similarly for other flows. This also applies to a case where a control message is processed by the processing device 20e.

Table T4 (FIG. 9) illustrates transfer information set for the processing device 20e. The information elements included in table T4 is similar to those in table T3. Accordingly, when a control message included in flow B has been processed, the processing device 20e specifies queue Q21 of the transfer device 10b as a transfer destination in order to report the result to the control device 30a. Further, when a control message included in flow C has been processed, the processing device 20e specifies queue Q22 of the transfer device 10b as a transfer destination in order to report the result to the control device 30a.

Note that the examples of the tables illustrated in FIG. 9 are exemplary, and may be changed in accordance with implementations. When for example one of the transfer device 10 is used for the transfer processes of both uplink control messages and downlink control messages, the transfer device 10 holds information used for uplink transfer and information used for downlink transfer. In this case too, information used for uplink transfer may be information similar to that in table T1 and information used for downlink transfer may be information similar to that in table T2.

(2) Information Held by the Coordination Device 50

Prior to the explanations of an example of a process for detecting and avoiding congestion, information used by the coordination device 50 for detecting congestion will be explained.

Figure 10:
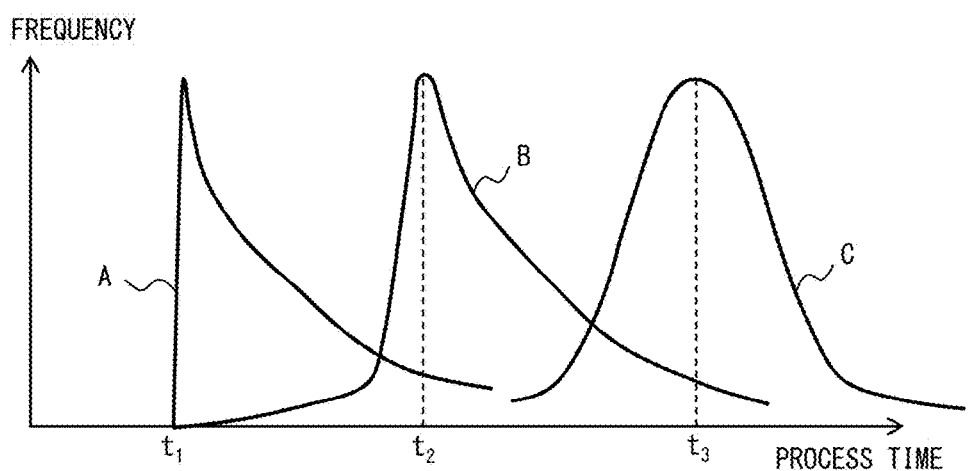
FIG. 10 explains an example of the distribution of process times.

FIG. 10 explains an example of the distribution of process times. In FIG. 10, the frequencies of reporting process times that were obtained in an empirical manner are represented separately for a case where congestion has not occurred in the controller system 1, a case where congestion has occurred in the transfer device 10 and a case where congestion has occurred in the processing device 20. In the explanations below, it is assumed that the relationships between the times satisfy the inequality t1<t2<t3. "A" in FIG. 10 represents an example of distribution of process times obtained when congestion has not occurred in the controller system 1. "B" in FIG. 10 represents an example of distribution of process times obtained when congestion has occurred in at least one of the transfer devices 10 that are relaying communications between the control device 30 requesting a process of a control message and the processing device 20. "C" in FIG. 10 represents an example of distribution of process time obtained when congestion has occurred in the processing device 20 for which it is requested that a control message be processed. As represented by "A", the mode value of the process times in a case when congestion has not occurred in the controller system 1 is t1. Meanwhile, when congestion has occurred in the transfer device 10, the mode value of the process times becomes t2 as represented by "B" and the process times become longer than those in a case when congestion has not occurred (A). However, the delay caused by the congestion in the transfer device 10 is often shorter than the delay caused in the processing device 20. Accordingly, mode value t1 of the process times in a case when congestion has occurred in the transfer device 10 is smaller than mode value t2 of the process times in a case when congestion has occurred in the processing device 20 (C).

Threshold D_mq (message queue congestion determination threshold) and threshold D_app (application congestion determination threshold) are determined based on the distribution of the process times illustrated in FIG. 10. In this example, threshold D_mq is a threshold for determining whether or not congestion has occurred in a message queue in the transfer device 10 that is being used for relaying communications. Threshold D_app is a threshold for determining whether or not congestion has occurred in the processing device 20 for which it is requested that a control message be processed. For example, threshold D_mq is set to be greater than t1, which is the mode value in a case when congestion has not occurred, and equal to or smaller than t2, which is the mode value in a case when congestion has occurred in the transfer device 10. Also, threshold D_app is set to be greater than t2, which is the mode value in a case when congestion has occurred in the transfer device 10, and equal to or smaller than t3, which is the mode value in a case when congestion has occurred in the processing device 20.

FIG. 11 illustrates an example of the threshold information table 73. The threshold information table 73 records thresholds used for determining congestion in the flow and thresholds for canceling the determination of congested state in a state that they are associated with the identifier of each flow. The threshold information table 73 is used for a determination process in the determination unit 62. The determination unit 62 compares a process time reported from the control device 30 and threshold D_mq and threshold D_app for each flow. When a process time has become longer than threshold D_mq, the determination unit 62 determines that there is a possibility of congestion having occurred in a message queue in the transfer device 10 through which the corresponding flow passes. When a process time has become longer than threshold D_app, the determination unit 62 determines that there is a possibility of congestion having occurred in the processing device 20 through which the corresponding flow passes.

A message queue congestion cancellation threshold and an application congestion cancellation threshold are used for cancelling determination of a congested state. When the process time of a flow for which it has been determined that there is a possibility of congestion having occurred in the transfer device 10 has become shorter than the message queue congestion cancellation threshold, the determination unit 62 determines that the congestion has been avoided. Also, when the process time of a flow for which it has been determined that there is a possibility of congestion having occurred in the processing device 20 has become shorter than the application congestion cancellation threshold, the determination unit 62 determines that the congestion has been avoided.

(3) The Detection and Avoidance of Congestion Having Occurred in the Processing Device 20

Next, explanations will be given for an example of a process in which the coordination device 50b detects congestion having occurred in the processing device 20 and avoids the congestion. Similarly to the explanations with reference to FIG. 2, an example will be used in which the location of congestion is identified when there is one or more flows that has become longer than the application congestion cancellation threshold.

It is assumed that the process time regarding a control message in each flow has been reported by the control device 30a to the coordination device 50b based on the processes explained by referring to FIG. 7 and FIG. 9. The receiver 52 in the coordination device 50 outputs to the obtainment unit 61 a control message for reporting a process time (report message). The obtainment unit 61 obtains the identifier and the process time of the flow from the report message, and reports the obtained information to the determination unit 62.

FIG. 12 illustrates a table of an example of information held by the determination unit 62. For each flow, the determination unit 62 compares a process time reported by the obtainment unit 61 and the threshold in the threshold information table 73 so as to determine whether or not congestion has occurred. The table illustrated in FIG. 12 is an example of a result obtained by conducting a determination process for the process time of each flow by using the threshold information table 73 (FIG. 11). In the example illustrated in FIG. 12, the process times of control messages are 220 milliseconds for flow A, 20 nanoseconds for flow B and flow C and 230 milliseconds for flow D. Because the application congestion determination thresholds for flow A and flow D are both 200 milliseconds, the determination unit 62 determines that congestion has occurred in the processing device 20 that processes control messages for flow A and flow D. Meanwhile, the process times for flow B and flow C are both 20 nanoseconds while the application congestion determination threshold is 300 milliseconds and the message queue congestion determination threshold is 150 nanoseconds. And accordingly the determination unit 62 determines that congestion has not occurred.

In the table illustrated in FIG. 12, the determination results are expressed by values ranging from 0 through 2. In the explanations below, "determination result=0" represents that it has been determined that congestion has not occurred while "determination result=1" represents that it has been determined that congestion has occurred in a message queue. Further, when congestion has occurred in a process using application software in the processing device 20, "determination result=2" is set.

When there is at least one flow having a possibility of congestion having occurred in the processing device 20, the determination unit 62 uses the determine result (FIG. 12) and the transfer route table 71-1 (FIG. 8) so as to identify the location at which the congestion has occurred. The table of determination results illustrated in FIG. 12 records the fact that congestion has occurred in the processing device 20. Then, based on the transfer route table 71-1, the determination unit 62 determines that the processing device that processes a control message of flow A is the processing device 20d and then, determines that congestion has occurred in the processing device 20d. The determination unit 62 conducts a similar process for flow D, and thereby determines that congestion has occurred in the processing device 20d also based on the process time of a control message included in flow D. When the location of the congestion has been identified, the route calculation unit 63 outputs the identification result to the route calculation unit 63.

For a flow for which the occurrence of congestion has been determined, the route calculation unit 63 calculates a transfer route and a processing device that used a device for which the occurrence of congestion has not been reported by the determination unit 62. The route calculation unit 63 uses information obtained by excluding, from the information recorded in the topology information 72, the device for which the occurrence of congestion has been reported by the determination unit 62, and thereby conducts the determination of the processing device and the route calculation. The determination of the processing device 20 and the route calculation are conducted by using an arbitrary method.

FIG. 13 illustrates a variation example of route information used when congestion has occurred in the processing device 20d. FIG. 13 illustrates an example of route information in a case when the process of the route calculation unit 63 has determined that both flow A and flow D are to be processed by the processing device 20c instead of the processing device 20d. Also, it is assumed that the route calculation unit 63 calculated routes without changing message queues for either flow A or flow D. Then, the route calculation unit 63 uses the obtained routes so as to update the transfer route table 71-1 (FIG. 8) to the state as represented by the transfer route table 71-2 illustrated in FIG. 13.

When the transfer route table 71 has been updated, the generating unit 64 generates a request message for requesting that the device for changing a transfer route update the transfer route. In other words, the generating unit 64 reports, to the processing device 20 that starts the process of the flow, information for identifying the control device 30 serving as the transmission destination of the process result, the transfer device 10 serving as the output destination of the message of the process result and the message queue. Also, the generating unit 64 requests that the transfer device 10 connecting between the processing device 20 starting the process of the control message and the control device 30 update the information of the processing device 20 serving as the transfer destination or the transfer source.

In the example illustrated in FIG. 13, the generating unit 64 requests that the processing device 20c start the processes of flow A and flow D, and also requests that the transfer device 10a transfer the control message stored in queue Q11 to the processing device 20c. Further, the generating unit 64 requests that the transfer device 10b relay the communications between the processing device 20c, the processing device 20e and the control device 30a. Then, the generating unit 64 includes, in the payload of the control message addressed to the processing device 20c, the information illustrated in table T3 (FIG. 9) together with information representing a request for the addition of a transfer route. The generating unit 64 includes, in the payload of the request message addressed to the transfer device 10a, the information illustrated in table T5 illustrated in FIG. 13 together with a request for changing of a transfer destination. Further, the generating unit 64 includes, in the payload of the request message addressed to the transfer device 10b, the information illustrated in table T6 illustrated in FIG. 13 together with a request for changing of a transfer destination. The generating unit 64 transmits the generated request messages to the destinations of the respective request messages via the transmitter 51.

When a request message has been received, the processing device 20c recognizes that it has been requested that the control messages of flow A and flow D be processed by application AP1. Because the processing device 20c stores transfer information included in a request message, the processing device 20c holds information illustrated in table T3 illustrated in FIG. 9 for flow A and flow D. When a request message has been received, the transfer device 10a updates information used for transfer processes from the state of table T1 (FIG. 9) to the state of table T5 (FIG. 13).

Accordingly, the transfer device 10a transfers messages stored in queue Q11 to the processing device 20c after the reception of a request message. Further, the transfer device 10b also updates information used for transfer processes from the state of table T2 (FIG. 9) to the state of table T6 (FIG. 13) in response to the reception of a request message. Accordingly, the transfer device 10b transfers messages received from the processing device 20c and the processing device 20e to the control device 30a after the reception of a request message.

Figure 14:
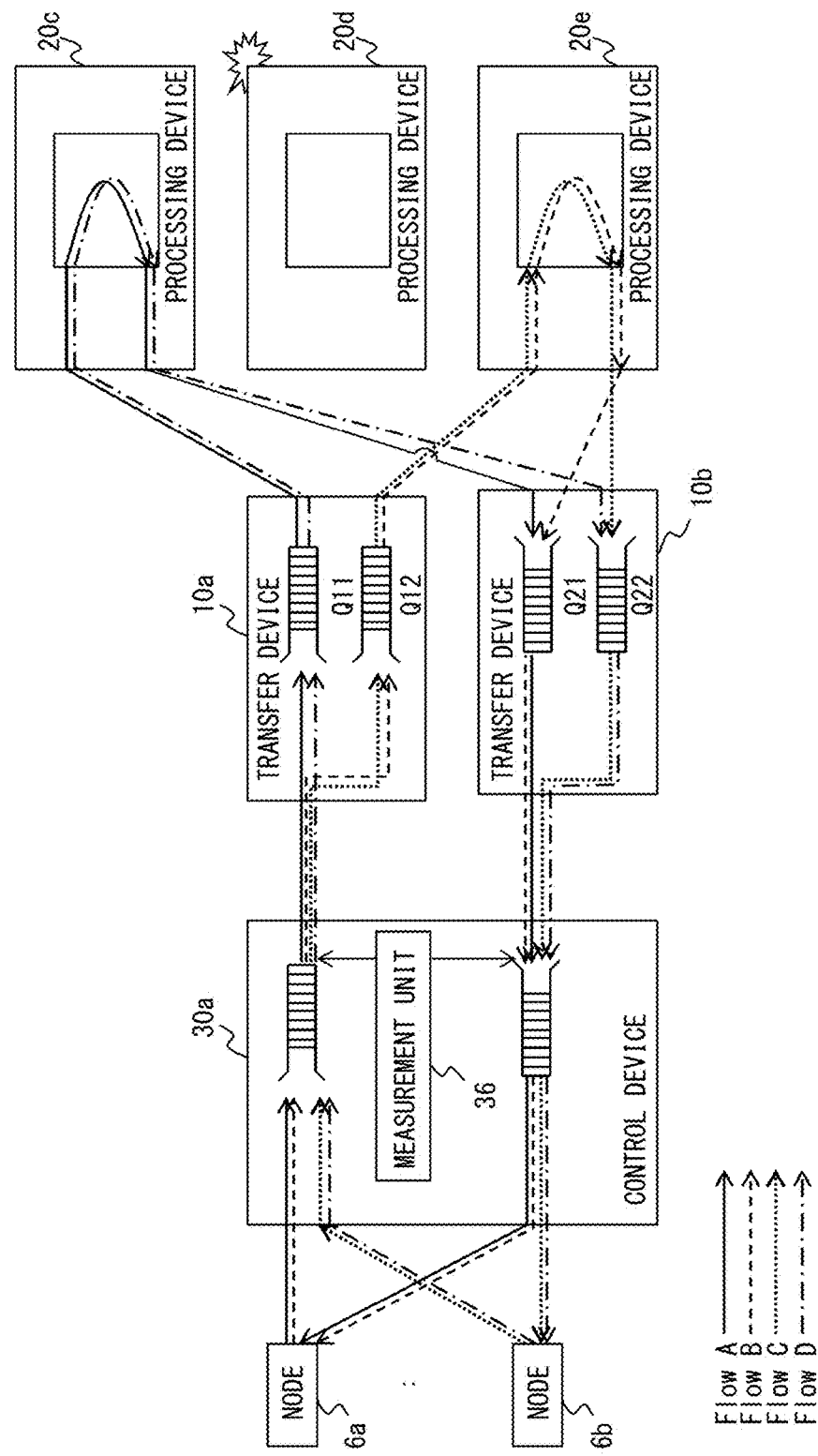
FIG. 14 illustrates variation examples of transfer routes used in a case when congestion has occurred in a processing device.

FIG. 14 illustrates variation examples of transfer routes used in a case when congestion has occurred in the processing device 20d. FIG. 14 illustrates transfer routes used when route information has been changed as illustrated in FIG. 13. Accordingly, in FIG. 14, flow A and flow D are transferred to the processing device 20c via message queue Q11 of the transfer device 10a. Meanwhile, because the transfer routes of flow B and flow C have not been changed from those illustrated in FIG. 7, flow B and flow C are transferred to the processing device 20e via message queue Q12 of the transfer device 10a. The process result in the processing device 20c for flow A and the process result in the processing device 20e for flow B are transferred to the control device 30a via message queue Q21 of the transfer device 10b. Also, the process result in the processing device 20c for flow D and the process result in the processing device 20e for flow C are transferred to the control device 30a via message queue Q22 of the transfer device 10b.

As described above, the coordination device 50 may use process times and the transfer route table 71 so as to identify the processing device 20 in which congestion has occurred. Also, when the processing device 20d has been identified as a location with congestion, the coordination device 50 may set a transfer route that bypasses the processing device 20d, which is the location with the congestion. Even after the operation using the transfer route illustrated in FIG. 14 has been started, the process times of control messages are measured for respective flows A through D in the control device 30a. Even after changing of transfer routes, the report process unit 37 of the control device 30a associates the values of obtained process times with the identifiers of the flows so as to report the values to the coordination device 50.

Similar processes are conducted on report messages, and accordingly the determination process by the determination unit 62 in the coordination device 50 is conducted again. Because "determination result=2" was obtained for flow A and flow D as illustrated in FIG. 12, the determination unit 62 uses the application congestion cancellation thresholds so as to determine whether or not congestion has been resolved. It is assumed in this situation that the control device 30a reported to the coordination device 50b that the process times of flow A and flow D are 50 nanoseconds respectively. Then, the determination unit 62 uses the threshold information table 73 (FIG. 11) so as to determine that the congestion states have been avoided because the process times of flow A and flow B have both become lower than the application congestion cancellation thresholds. Accordingly, the determination unit 62 changes the determination results to zero for flow A and flow D.

(4) The Detection and Avoidance of Congestion Having Occurred in the Transfer Device 10

Next, explanations will be given for an example of a process in which the coordination device 50b detects and avoids congestion having occurred in the transfer device 10. Note that it is assumed in the following explanations that communication processes have been conducted in the routes illustrated in FIG. 7 in accordance with the transfer route table 71-1 (FIG. 8) and the information illustrated in FIG. 9 until congestion has been detected. Also, regardless of whether or not congestion has occurred and of the location of congestion, the control device 30a reports the process times of the respective flows to the coordination device 50b by following procedures similar to those in the method described in the explanations for a case where congestion has occurred in the processing device 20. Also, the processes conducted by the obtainment unit 61 and the determination unit 62 are also similar to those described in the explanations for a case where congestion has occurred in the processing device 20.

FIG. 15 illustrates a table illustrating an example of information held by the determination unit 62. In the example illustrated in FIG. 15, the process times of control messages are 110 nanoseconds for flow A, 20 nanoseconds for flow B, 20 nanoseconds for flow C and 130 nanoseconds for flow D. As illustrated in FIG. 11, the message queue congestion determination threshold for flow A is 100 nanoseconds, and accordingly the determination unit 62 determines that congestion has occurred in one of the queues of the transfer devices 10 on the transfer route for flow A. For flow B and flow C, the determination unit 62 determines that congestion has not occurred because the message queue congestion determination thresholds are 150 nanoseconds while the process times are 20 nanoseconds. Meanwhile, because the process time is 130 nanoseconds while the message queue congestion determination threshold is 100 nanoseconds for flow D, the determination unit 62 determines that congestion has also occurred in one of the queues in the transfer devices 10 through which flow D passes. Accordingly, the determination results are "1" for flow A and flow D and "0" for flow B and flow C as illustrated in FIG. 15.

When it has been determined for one flow that congestion has occurred in one of the queues through which that flow passes, the determination unit 62 searches for a flow that passes through the same queue through which the flow having the congestion passes, and identifies the queue in which the congestion has occurred. As an example, explanations will be given for an example of a process for a case in which the queue causing congestion of flow A is identified. The determination unit 62 refers to the transfer route table 71-1 (FIG. 8) so as to determine that flow A and flow B pass through queue Q21. Then, the determination unit 62 selects queue Q21 as a target of determination of whether or not congestion has occurred, and determines whether or not congestion has occurred in queue Q21. When congestion has occurred in queue Q21, it is expected that the process times of both flow A and flow B will become longer. Accordingly, the determination unit 62 determines whether or not congestion has occurred in flow B. In this example, congestion has not occurred in flow B as illustrated in FIG. 15. Accordingly, the determination unit 62 determines that congestion has not occurred in queue Q21.

Next, the determination unit 62 uses the transfer route table 71-1 so as to identify a queue that flow A uses in addition to queue Q21, and obtains the flow that passes through that queue. As illustrated in the transfer route table 71-1, flow A and flow D both pass through queue Q11. Accordingly, the determination unit 62 determines whether or not the process time has become longer than the message queue congestion determination threshold also for flow D, and determines whether or not congestion has occurred in queue Q11. In flow D, similarly to flow A, processes are delayed by the congestion in the message queue, and accordingly the determination unit 62 determines that congestion has occurred in queue Q11.

In other words, when there are a plurality of flows having a possibility that congestion has occurred in the transfer devices 10, the determination unit 62 attempts to identify the location of the occurrence of congestion. In this process, when the determination unit 62 was able to identify one queue used in common by a plurality of flows for which the occurrence of congestion in the transfer devices 10 has been determined, the determination unit 62 determines that the identified queue is the cause of the congestion. When there are a plurality of queues used in common by a plurality of flows for which the occurrence of congestion in the transfer devices 10 has been determined, the determination unit 62 determines that it was impossible to identify a queue that caused the congestion. Also in a case when there is not a queue that is used in common by a plurality of flows for which the occurrence of congestion in the transfer devices 10 has been determined, the determination unit 62 determines that it was impossible to identify a queue that caused the congestion.

When the determination unit 62 succeeded in identifying the location of the occurrence of congestion, the determination unit 62 outputs the identifying result to the route calculation unit 63. When the location of the occurrence of the congestion has been reported by the determination unit 62, the route calculation unit 63 calculates a transfer route that does not pass through the reported queue.

FIG. 16 illustrates a variation example of route information in a case when congestion has occurred in the transfer device 10. FIG. 16 illustrates an example of route information in a case when the process by the route calculation unit 63 determined that both flow A and flow D are to be processed by the transfer device 10c instead of the transfer device 10a. Also, it is assumed that the route calculation unit 63 calculated, for both flow A and flow D, route that do not change the processing device 20 for processing control messages. Then, the route calculation unit 63 uses the obtained route so as to update the transfer route table 71-1 (FIG. 8) to the state of the transfer route table 71-3 illustrated in FIG. 16.

Also when the transfer route table 71-1 has been updated to the transfer route table 71-3, the generating unit 64 generates a request message for requesting that the device for changing a transfer route update the transfer route. In other words, the generating unit 64 generates a request message for making the control device 30a change the transfer destinations of flow A and flow D to the queue Q31 of the transfer device 10c. Further, based on the request message addressed to the transfer device 10c that starts the transfer processes of flow A and flow D, the generating unit 64 requests that communications between the control device 30a and the processing device 20d be relayed by using queue Q31. In this process, the generating unit 64 also includes, in the request message addressed to the transfer device 10c, the fact that application AP1 is used for the process in the transfer-destination processing device 20d.

When a request message has been received, the transfer process unit 38 of the control device 30a recognizes that it has been requested that the transfer destination of control messages of flows A and D be changed to queue Q31 of the transfer device 10c. Then, the transfer process unit 38 updates the request target table 41-1 (FIG. 9) to the state as illustrated as the table 41-2 (FIG. 16). When a request message has been received, the transfer device 10c adds information illustrated in table T7 (FIG. 16) to information used for the transfer processes.

FIG. 17 illustrates a variation example of a transfer route in a case when congestion has occurred in the transfer device 10. FIG. 17 illustrates a transfer route used when route information has been changed as illustrated in FIG. 16. Accordingly, flows A and D have been transferred to the processing device 20d via message queue Q31 of the transfer device 10c in FIG. 17. Meanwhile, because the transfer route of flow B or C is not changed from the routes illustrated in FIG. 7, those flows are transferred to the processing device 20e via queue Q12 of the transfer device 10a. The transfer routes of the process results have not been changed from the state illustrated in FIG. 7 for any of flows A through D. Accordingly, the process result for flow A in the processing device 20d and the process result for flow B in the processing device 20e are transferred to the control device 30a via the message queue Q21 of the transfer device 10b. Also, the process result for flow D in the processing device 20d and the process result for flow C in the processing device 20e are transferred to the control device 30a via the message queue Q22 of the transfer device 10b.

As described above, the coordination device 50 may identify a message queue in the transfer devices 10 as a location with congestion, and further may set a transfer route that bypasses a queue in which congestion has occurred. Even after an operation using the transfer routes illustrated in FIG. 17 has been started, the control device 30a measures the process times of control messages and reports the process times for the respective flows, similarly to a case when congestion has been detected in the processing device 20. Accordingly, when the process times of flow A and flow D have become lower than the message queue congestion cancellation thresholds, the setting indicating a congestion state is resolved.

Hereinafter, by referring to FIG. 18 through FIG. 21, explanations will be given for a process conducted when the detection of failure is also conducted in addition to the detection of congestion. Also in a case when a failure has been detected, it is assumed that the determination unit 62 reports the location of the occurrence of the failure to the route calculation unit 63 and the route calculation unit 63 calculates a transfer route that does not include the location of the occurrence of the failure. Also, it is assumed that the generating unit 64 generates a request message on an as-needed basis in order to report a transfer route not including the location of the occurrence of a failure. Also, in FIG. 18 through FIG. 21, explanations will be given for a process for a case where it is determined that a failure or congestion has occurred when a plurality of delays have been detected at the same location in order to increase the detection accuracy. Also, in the explanations below, in order to prevent a situation where routes are changed unnecessarily excessively due to variations in process times, the average value of the process times is used for each flow when whether or not congestion has occurred is determined.

Figure 18:
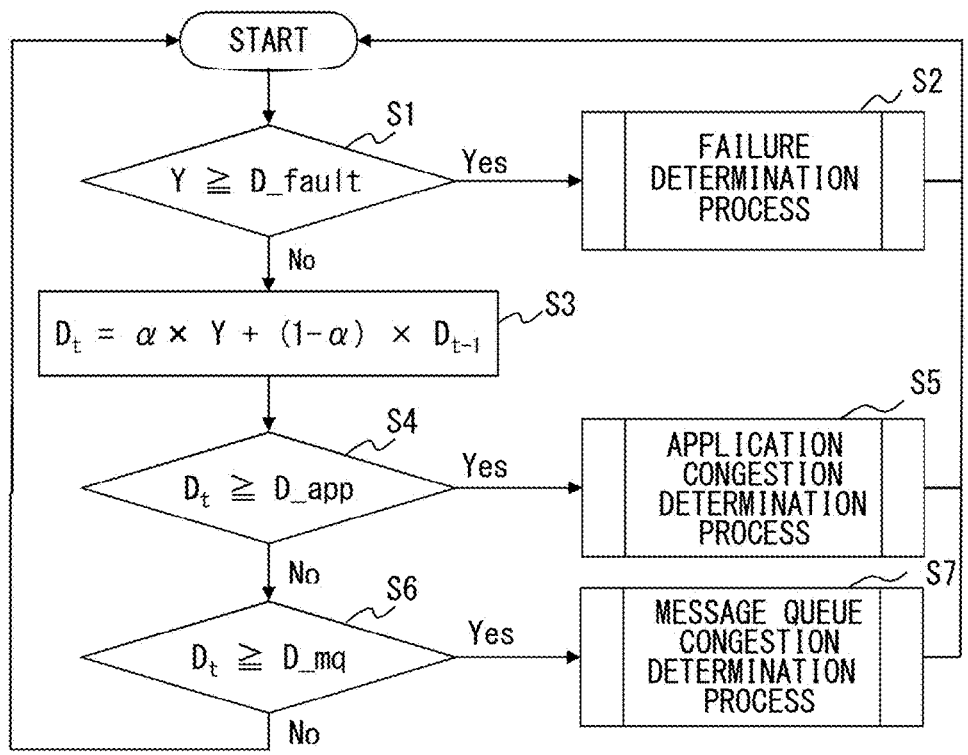
FIG. 18 illustrates a flowchart for explaining an example of a process conducted by a coordination device.

FIG. 18 illustrates a flowchart for explaining an example of a process conducted by a coordination device. Note that the flowchart illustrated in FIG. 18 is an example and may be changed in accordance with implementations. For example, the method of calculating the average value in S3 may be changed in accordance with implementations.

When process time (Y) reported from the control device 30 has been obtained from the obtainment unit 61, the determination unit 62 of the coordination device 50 compares the process time and failure determination threshold (D_fault) (step S1). When reported process time Y is equal to or longer than threshold D_fault, the determination unit 62 conducts a failure determination process (Yes in step S1, step S2). Threshold D_fault is a value that is great sufficiently to be determined to be an abnormal value as a process time, and the higher the possibility that a failure has occurred in the transfer device 10 or the processing device 20 is, the higher the value is set to be. It is assumed that when a failure in obtaining a process time has been reported from the control device 30, the determination unit 62 considers the process time to be longer than threshold D_fault.

When process time Y is shorter than threshold D_fault, the determination unit 62 calculates average value $D_t$ of the process times (No in step S1, step S3). In the example illustrated in FIG. 18, the determination unit 62 obtains average value $D_t$ from the following equation by using an exponential moving average, where a is a smoothing coefficient and satisfies $0<\alpha<1$. Y is the value of the process time reported from the control device 30, and $D_{t-1}$ is the average value obtained by the previous calculation.

$$D_t = \alpha \times Y + (1-\alpha) \times D_{t-1}$$

The determination unit 62 determines whether or not average value $D_t$ is equal to or greater than threshold D_app (step S4). When average value $D_t$ is equal to or greater than threshold D_app, the determination unit 62 conducts an application congestion determination process (Yes in step S4, step S5). When average value $D_t$ is smaller than threshold D_app, the determination unit 62 determines whether or not average value $D_t$ is equal to or greater than threshold D_mq (No in step S4, step S6). When average value $D_t$ is equal to or greater than threshold D_mq, the determination unit 62 conducts a message queue congestion determination process (Yes in step S6, step S7). When average value $D_t$ is smaller than threshold D_mq, the determination unit 62 makes the process return to step S1. Also, even after the determination processes in steps S2, S5 and S7, the determination unit 62 repeats the processes in and after step S1 when a new process time has been reported.

FIG. 19 illustrates a flowchart for explaining an example of a failure determination process. FIG. 19 illustrates in detail the process executed in step S2 of FIG. 18. The determination unit 62 identifies the processing device 20 and a queue that are processing a flow for which the process time has become longer than threshold D fault (step S11). In this process, it is assumed that the determination unit 62 uses the transfer route table 71 on an as-needed basis. The determination unit 62 stores total number N of identified targets (step S12). Next, the determination unit 62 sets variable n to "1" (step S13). Variable n is used for counting the number of targets for which whether or not it is a location of the occurrence of a failure has been determined.

The determination unit 62 determines whether or not the process times of a plurality of flows passing through the n-th target have become longer than threshold D fault (step S14). When the process times have become longer than threshold D fault for a plurality of flows passing through the n-th target, the determination unit 62 sets the n-th target as a candidate for a location with a failure (Yes in step S14, step S15). Thereafter, the determination unit 62 increments variable n by one, and determines whether or not variable n has become greater than constant N (step S16, S17). When variable n is equal to or smaller than constant N, the determination unit 62 repeats the processes in and after step S14 (No in step S17).

When variable n has become greater than constant N, the determination unit 62 determines whether or not there is a candidate for a location with a failure (Yes in step S17, step S18). When there is a candidate for a location with a failure, it is determined whether or not there are a plurality of candidates for a location with a failure (Yes in step S18, step S19). When there is one candidate for a location with a failure, the determination unit 62 determines the candidate to be the location with a failure, and conducts processes for failure recovery together with the generating unit 64 (No in step S19, step S20).

When there is not a candidate for a location with a failure, the determination unit 62 determines that the identifying of a location with a failure has failed (No in step S18, step S21). Then, the route calculation unit 63 changes the processing device 20 and a queue on the route for a flow whose process time has become longer than threshold D_fault, and makes a report to an administrator (step S22). Also when there are a plurality of candidates for a location with a failure, the determination unit 62 determines that the identifying of a location with a failure has failed (Yes in step S19, step S21). Accordingly, the process in step S22 is conducted.

Figure 20:
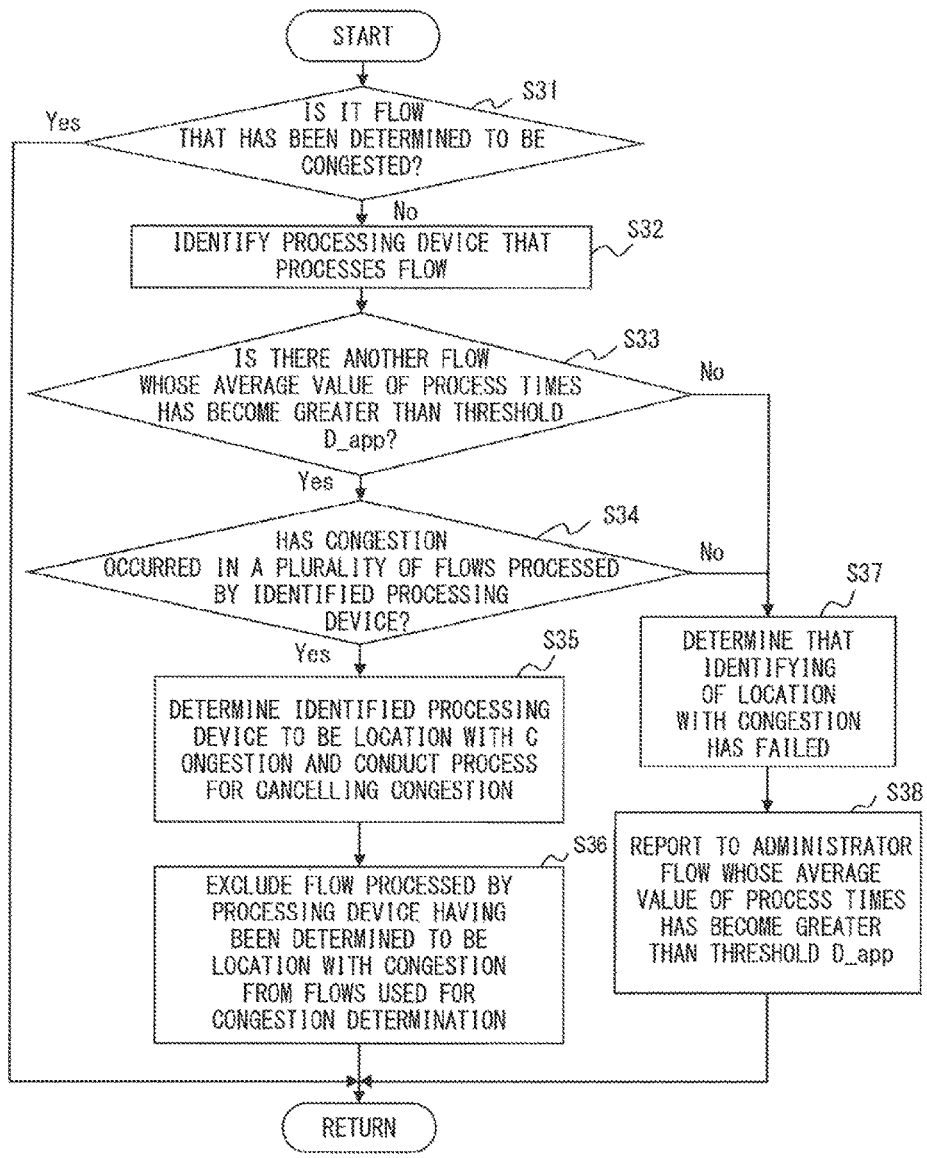
FIG. 20 illustrates a flowchart for explaining an example of a method of determining the occurrence of congestion in a processing device.

FIG. 20 illustrates a flowchart for explaining an example of a method of determining the occurrence of congestion in a processing device. FIG. 20 illustrates in detail the process executed in step S5 illustrated in FIG. 18. When the determination unit 62 determines whether or not the process-target flow is a flow that has been determined to be congested and has been set as a flow not to be used for the determination processes (step S31). For this process, the determination unit 62 may use, on an as-needed basis, determination results in a table as illustrated in FIG. 12 or other figures. When the process-target flow is a flow that is congested and has been excluded from process targets, the determination unit 62 terminates the process (Yes in step S31).

When the process-target flow is not a flow that has been determined to be congested, the determination unit 62 identifies the processing device 20 that is processing that flow (No in step S31, step S32). In this process, it is assumed that the determination unit 62 uses the transfer route table 71 on an as-needed basis. Next, the determination unit 62 determines whether or not there is a flow whose average value of the process times has become greater than threshold D_app in addition to the process-target flow (step S33). When there is a flow whose average value of the process times has become greater than threshold D_app in addition to the process-target flow, the determination unit 62 determines whether or not congestion has occurred in a plurality of flows that are processed by the processing device 20 identified in step S32 (Yes in step S33, step S34). When congestion has occurred in a plurality of flows processed by the identified processing device 20, the determination unit 62 determines the identified processing device 20 to be a location with congestion, and conducts a process for resolving the congestion (Yes in step S34, step S35). The determination unit 62 excludes a flow processed by the processing device 20 having been determined to be a location with congestion from flows to be used for the congestion determination, and makes the process return to step S1 (step S36).

When it has been determined in step S33 that there is only one flow whose average value of the process times has become greater than threshold D_app, the determination unit determines that the identifying of a location with congestion has failed (No in step S33, step S37). The determination unit 62 conducts a process of reporting to an administrator information of a flow whose average value of the process times has become greater than threshold D_app (step S38). Further, also when it has been determined in step S34 that congestion has not occurred in a plurality of flows processed by the identified processing device (No in step S34), the processes in steps S37 and S38 are conducted. The process of reporting the information of a flow to the administrator includes for example transmitting to the terminal device used by the administrator information representing the identifier of the flow to be reported and information representing that the average value of the process times of that flow has become greater than the application congestion determination threshold. The terminal device used by the administrator outputs the contents of the report from the coordination device 50 in an arbitrary form that allows the administrator to understand the contents.

FIG. 21 illustrates a flowchart for explaining an example of a method of determining the occurrence of congestion in a transfer device. FIG. 21 illustrates in detail the process executed in step S7 illustrated in FIG. 18. The determination unit 62 determines whether or not the process-target flow is a flow that has been determined to be congested and has been set as a flow not to be used for the determination processes (step S41). For this process, the determination unit 62 may use, on an as-needed basis, determination results in a table as illustrated in FIG. 15 or other figures. When the process-target flow is a flow that is congested and has been excluded from process targets, the determination unit 62 terminates the process (Yes in step S41).

When the process-target flow is not a flow that has been determined to be congested, the determination unit 62 identifies queues through which that flow passes (No in step S41, step S42). For this process, it is assumed that the determination unit 62 uses the transfer route table 71 on an as-needed basis. The determination unit 62 stores total number M of the identified queues (step S43). Next, the determination unit 62 sets variable m to "1" (step S44). Note that variable m is used for counting the number of the queues for which whether or not it is a location of the occurrence of congestion has been determined.

The determination unit 62 determines whether or not a plurality of flows that pass through the m-th queue of the identified queues are congested (step S45). It is assumed that, in step S45, when the average value of the process times for each flow has become greater than threshold D_mq, the determination unit 62 determines that congestion has occurred. When congestion has occurred in a plurality of flows that pass through the m-th queue, the determination unit 62 sets the m-th target as a candidate for a location with congestion (Yes in step S45, step S46). Thereafter, the determination unit 62 increments variable m by one, and determines whether or not variable m has become greater than constant M (step S47, S48). When variable m is equal to or smaller than constant M, the determination unit 62 repeats the processes in and after step S45 (No in step S48).

When variable m has become greater than constant M, the determination unit 62 determines whether or not there is a candidate for a location with congestion (Yes in step S48, step S49). When there is a candidate for a location with congestion, it is determined whether or not there are a plurality of candidates for a location with congestion (Yes in step S49, step S50). When there is one candidate for a location with congestion, the determination unit 62 determines the candidate for a location with congestion to be the location with congestion, and conducts processes for resolving the congestion (No in step S50, step S51). The determination unit 62 excludes a flow passing through the queue determined to be the location with congestion from flows to be used for congestion determination, and makes the process return to step S1 (step S52).

When there is not a candidate for a location with congestion, the determination unit 62 determines that the identifying of a location with congestion has failed (No in step S49, step S53). The determination unit 62 conducts a process of reporting to the administrator information of a flow whose average value of the process times has become greater than threshold D_mq (step S54). Further, also when it has been determined in step S50 that there are a plurality of queues that are candidates for a location with congestion (Yes in Step S50), the processes in step S53 and step S54 are conducted.

FIG. 22 illustrates a flowchart for explaining an example of a process of resolving congestion. The determination unit 62 determines whether or not the process-target flow has been determined to be congested (step S61). When the process-target flow is not a flow that has been determined to be a congested flow, the determination unit 62 terminates processes on the process-target flow, and starts processes on other flows. When the process-target flow is a flow that has been determined to be a congested flow, the determination unit 62 determines whether or not average value $D_t$ of the process times for that flow has become smaller than a message queue congestion cancellation threshold (D_mq_release) (step S62). When average value $D_t$ of the process times has become smaller than a message queue congestion cancellation threshold, the setting that the process-target flow is in a message queue congestion state is cancelled (Yes in step S62, step S63). When average value $D_t$ of the process times is equal to or greater than the message queue congestion cancellation threshold, the determination unit 62 determines whether or not average value $D_t$ of the process times has become smaller than an application congestion cancellation threshold (D_app_release) (No in step S62, step S64). When average value $D_t$ of the process times has become smaller than the application congestion cancellation threshold, the setting that the process-target flow is in an application congestion state (Yes in step S64, step S65). When average value $D_t$ of the process times is equal to or greater than the application congestion cancellation threshold, the determination unit 62 terminates processes on the process-target flow, and starts processes on other flows (No in step S64).

As described above, the coordination device 50 uses the process times of control messages so as to identify a location of the occurrence of congestion and set a transfer route that does not use the location at which the congestion has occurred. Further, the coordination device 50 transmits a request message to a device that requests that the transfer route be changed, and thereby makes the set transfer route be used. Accordingly, even when congestion has occurred in the controller system 1, the congestion is resolved efficiently and the controller system 1 is operated stably.

In addition, even the method according to the embodiment is used, the processes in the transfer devices 10 and the processing devices 20 are similar to those in a case where the method of the embodiment is not introduced. Accordingly, the method according to the embodiment may be introduced to a system without changing devices or software that implement the transfer devices 10 and the processing device 20.

By using the method according to an embodiment, congestion in a system using a distributed network controller is resolved more efficiently.

>Others≤

The embodiment is not limited to the above descriptions and allows various changes. Some examples thereof will be described below.

When process times are reported to the coordination device 50, the report process unit 37 may obtain the average value of the process times for each flow in each cycle of the reporting so as to report the identifier of the flow and the average value of the process times to the coordination device 50b. In such a case, the obtainment unit 61 does not need to obtain the average value from the process times reported from the control device 30 when the length of the cycle of the reporting of the process times permits the soothing of the fluctuations in the process times.

The above explanations have used an example of a case in which the routes are changed for all flows passing through a location with congestion. However, the coordination device 50 may change the routes of some of the congested flows and wait for a prescribed period of time without changing other routes. When congestion has been avoided by changing some of the routes, the coordination device 50 does not have to change any more routes.

Also, the tables described in the above explanations such as the request target table 41, the transfer route table 71, the threshold information table 73, etc. are just exemplary, and information elements stored in the respective tables may be changed in accordance with implementations.

While the above explanations used an example of a case in which the process times are compared between flows that passed through the same control device 30 in order to facilitate the understanding. However, it is also possible to identify a location with congestion by using process times measured by different control devices 30. For example, when flow A measured by the control device 30a and flow E measured by the control device 30b use the same processing device 20 or a queue in common, the coordination device 50 uses the process times of flow A and flow E so as to identify a location with congestion.

Further, it is also possible to employ an embodiment in which the processing devices, the transfer devices and the control devices are arranged in a virtual machine of a cloud system and an embodiment in which each of such devices is provided in a physical server and the physical servers are connected by a network for controlling.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A route determination apparatus in a communication system including a plurality of transfer devices, a plurality of processing devices and a control device, the route determination apparatus comprising:
   a processor; and
   a network connection device that conducts transmission and reception of a message, wherein
   the processor:
      obtains a process time, which is a time taken to process a control message, when the control device requests that a target processing device selected from among the plurality of processing devices process the control message including a process-target packet; and
      determines, when the process time has become longer than a first threshold, which of a first congestion and a second congestion has occurred based on whether or not the process time has become longer than a second threshold, which is greater than the first threshold, the first congestion occurring in the transfer devices used for a communication between the control device and the target processing device and the second congestion occurring in the target processing device, and
   the network connection device transmits a request message requesting that a transfer route for which it has been determined that the control message is not processed in a device in which the congestion has occurred be set.

2. The route determination apparatus according to claim 1, wherein
   the processor:
   calculates the transfer route;
   generates the request message used for setting the transfer route;
   determines that a process is delayed by congestion in the target processing device when the process time is longer than the second threshold;
   obtains the transfer route by selecting a different processing device different from the target processing device from among the plurality of processing devices; and
   generates the request message for requesting that a transfer device that transfers the control message received from the control device to the target processing device transfer the control message received from the control device to the different processing device.

3. The route determination apparatus according to claim 1, wherein
   the processor:
   treats, as a determination target, a transfer device that transfers the control message received from the control device to the target processing device when a first process time obtained for a first flow is longer than the first threshold and equal to or shorter than the second threshold, the first flow being a flow of a first control message that the control device requests that the target processing device process;
   identifies a second flow in which a second control message is transferred to one of the plurality of processing devices via the determination target;
   obtains a length of a second process time, which is a process time for the second control message belonging to the second flow; and
   determines that a process has been delayed by congestion in the transfer device that is transferring the first flow to the target process device when the second process time is longer than the first threshold and equal to or shorter than the second threshold.

4. The route determination apparatus according to claim 3, wherein
   the processor:
   identifies a third flow, which passes through a different transfer device that transfers the control message in the first flow from the target processing device to the control device when the second process time is equal to or shorter than the first threshold;
   obtains a length of a third process time, which is a process time for a third control message belonging to the third flow; and
   determines that the process has been delayed by congestion in the different transfer device when the third process time is longer than the first threshold and equal to or shorter than the second threshold.

5. A determining method of a transfer route in a communication system including a plurality of transfer devices, a plurality of processing devices, a route determination apparatus and a control device, wherein the route determination apparatus executes the determining method including:

obtaining a process time, which is a time taken to process a control message, when the control device requests that a target processing device selected from among the plurality of processing devices process the control message including a process-target packet;

determining, when the process time has become longer than a first threshold, which of a first congestion and a second congestion has occurred based on whether or not the process time has become longer than a second threshold, which is greater than the first threshold, the first congestion occurring in the transfer devices used for a communication between the control device and the target processing device and the second congestion occurring in the target processing device, and determining a transfer route in such a manner that a process-target control message is not processed in a device in which the congestion has occurred.

6. The determining method of a transfer route according to claim 5, wherein the route determination apparatus executes the determining method including:

determining that a process is delayed by congestion in the target processing device when the process time is longer than the second threshold;

obtaining the transfer route by selecting a different processing device different from the target processing device from among the plurality of processing devices; and requesting that a transfer device that transfers the control message received from the control device to the target processing device transfer the control message received from the control device to the different processing device.

7. The determining method of a transfer route according to claim 5, wherein the route determination apparatus executes the determining method including:

treating, as a determination target, a transfer device that transfers the control message received from the control device to the target processing device when a first process time obtained for a first flow is longer than the first threshold and equal to or shorter than the second threshold, the first flow being a flow of a first control message that the control device requests that the target processing device process;

identifying a second flow in which a second control message is transferred to one of the plurality of processing devices via the determination target;

obtaining a length of a second process time, which is a process time for the second control message belonging to the second flow; and determining that a process has been delayed by congestion in a transfer device that is transferring the first flow to the target process device when the second process time is longer than the first threshold and equal to or shorter than the second threshold.

* * * * *